United States Patent
Jung et al.

(10) Patent No.: US 10,269,284 B2
(45) Date of Patent: Apr. 23, 2019

(54) TIMING CONTROLLER AND DISPLAY DRIVING CIRCUIT INCLUDING THE SAME

(71) Applicant: SAMSUNG ELECTRONICS CO., LTD., Suwon-si, Gyeonggi-do (KR)

(72) Inventors: Ho-Young Jung, Seoul (KR); Jong-Oh Lee, Anyang-si (KR); Jae-Chul Lee, Seongnam-si (KR); Kyoung-Mook Lim, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 33 days.

(21) Appl. No.: 15/435,368

(22) Filed: Feb. 17, 2017

(65) Prior Publication Data

US 2018/0061299 A1 Mar. 1, 2018

(30) Foreign Application Priority Data

Aug. 25, 2016 (KR) ........................ 10-2016-0108377

(51) Int. Cl.
*G09G 3/20* (2006.01)
*G06F 3/041* (2006.01)
(Continued)

(52) U.S. Cl.
CPC ......... *G09G 3/2007* (2013.01); *G06F 3/0412* (2013.01); *G09G 3/006* (2013.01);
(Continued)

(58) Field of Classification Search
CPC ....... G09G 2340/02; G09G 2340/0428; G09G 2340/0435; G09G 2310/027; G09G 2310/08; G09G 2370/08; G09G 3/3648; G09G 3/3696; G09G 3/3611; G09G 3/2092; G09G 3/3688; G09G 3/3685; G09G 5/006; G09G 5/18; G09G 2320/0233; G09G 2320/029; G06F 3/0412; G06F 3/14; G06F 3/0416; G06F 17/30153; H04N 19/15; H04N 19/182; H04N 13/161
See application file for complete search history.

(56) References Cited

U.S. PATENT DOCUMENTS 5,471,111 A 11/1995 Kim
5,521,459 A 5/1996 Kim
(Continued)

FOREIGN PATENT DOCUMENTS

KR 10-0140096 3/1998
KR 10-0443808 7/2004
(Continued)

*Primary Examiner* — Dismery Mercedes
(74) *Attorney, Agent, or Firm* — Volentine, Whitt & Francos, PLLC

(57) ABSTRACT

A display driving circuit includes a timing controller including an encoder that compresses image data based on a reference having a number of image pixels of the image data as a compression unit and that outputs the compressed image data. The timing controller further includes at least one source driver including a decoder that decompresses compressed image data and transmits decompressed image data to a display panel through a plurality of channels. Compression by the encoder based on a first reference is performed independently of compression based on a second reference.

20 Claims, 20 Drawing Sheets

(51) Int. Cl.
  *G09G 3/36* (2006.01)
  *G09G 5/00* (2006.01)
  *G09G 3/00* (2006.01)
(52) U.S. Cl.
  CPC .......... *G09G 3/3688* (2013.01); *G09G 5/006* (2013.01); *G09G 2300/0857* (2013.01); *G09G 2310/027* (2013.01); *G09G 2310/08* (2013.01); *G09G 2320/029* (2013.01); *G09G 2340/02* (2013.01); *G09G 2370/08* (2013.01)

(56) References Cited

U.S. PATENT DOCUMENTS

| | | | | |
|---|---|---|---|---|
| 6,604,158 B1* | 8/2003 | Fallon | .................. | G06F 3/0608 |
| | | | | 709/246 |
| 7,629,956 B2 | 12/2009 | Jang et al. | | |
| 8,502,807 B2* | 8/2013 | Tsao | ........................ | G09G 3/20 |
| | | | | 345/204 |
| 8,638,285 B2 | 1/2014 | Nose et al. | | |
| 9,001,017 B2* | 4/2015 | Moon | .................. | G09G 3/3611 |
| | | | | 345/99 |
| 9,053,673 B2* | 6/2015 | Yuan | ........................ | G09G 3/20 |
| 9,071,838 B2* | 6/2015 | Cho | .................... | G09G 3/2092 |
| 9,202,442 B2 | 12/2015 | Furihata et al. | | |
| 9,437,129 B2* | 9/2016 | Lee | ........................ | G09G 3/2085 |
| 9,583,058 B2* | 2/2017 | Wang | .................... | G09G 3/3674 |
| 9,892,701 B2* | 2/2018 | Park | .................... | G09G 3/3666 |
| 2007/0296822 A1* | 12/2007 | Lan | .................... | H04N 21/4126 |
| | | | | 348/211.99 |
| 2010/0315406 A1* | 12/2010 | Nose | ........................ | G09G 3/20 |
| | | | | 345/212 |
| 2012/0056857 A1* | 3/2012 | Li | ............................ | G09G 3/20 |
| | | | | 345/204 |
| 2014/0022221 A1* | 1/2014 | Furihata | ................ | G09G 3/003 |
| | | | | 345/204 |
| 2014/0104249 A1 | 4/2014 | Furihata et al. | | |
| 2014/0146098 A1* | 5/2014 | Furihata | .................. | G09G 5/00 |
| | | | | 345/694 |
| 2014/0184574 A1* | 7/2014 | Shie | ........................ | G09G 5/008 |
| | | | | 345/204 |
| 2015/0325184 A1* | 11/2015 | Hsiao | .................... | H04N 19/30 |
| | | | | 345/204 |

FOREIGN PATENT DOCUMENTS

KR  10-2013-0120319    11/2013
KR  10-1529495         6/2015

\* cited by examiner

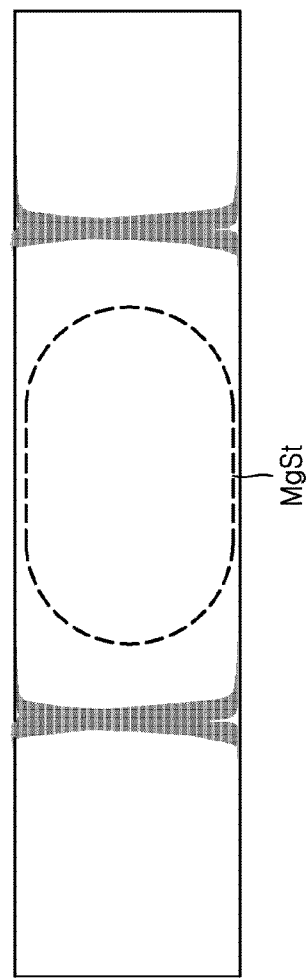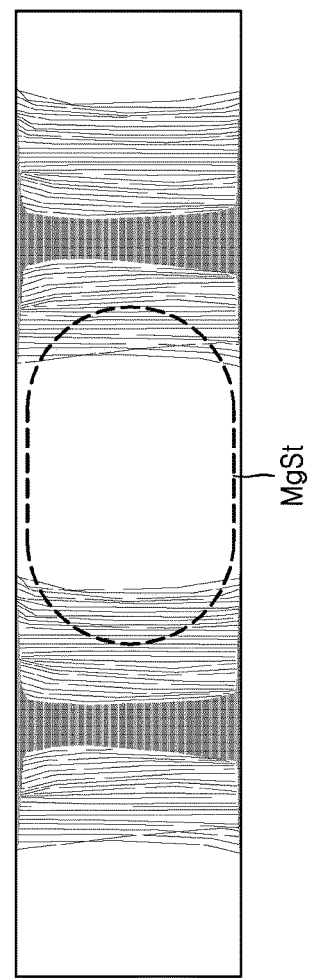

TIMING CONTROLLER AND DISPLAY DRIVING CIRCUIT INCLUDING THE SAME

CROSS-REFERENCE TO RELATED APPLICATION

A claim of priority under 35 U.S.C. § 119 is made to Korean Patent Application No. 10-2016-0108377, filed on Aug. 25, 2016, in the Korean Intellectual Property Office, the entire contents of which are hereby incorporated by reference.

BACKGROUND

The present inventive concept herein relates to a timing controller and a display driving circuit, and more particularly, to a timing controller and a display driving circuit that may improve reliability of signal transmission.

SUMMARY

Embodiments of the inventive concept provide a display driving circuit that enables data transmission with an improved transmission margin.

Embodiments of the inventive concept provide a timing controller that may transmit data with an improved transmission margin.

Embodiments of the inventive concept provide a display driving circuit which includes a timing controller including an encoder that compresses image data based on a reference having $\alpha$ image pixels of the image data as a compression unit and outputs the compressed image data, wherein $\alpha$ is an integer greater than or equal to 1. The display driving circuit further includes at least one source driver including a decoder that decompresses the compressed image data and applies grayscale voltages that correspond to the decompressed image data to a display panel through a plurality of channels. The compression by the encoder based on a first reference is performed independently of compression based on a second reference.

Embodiments of the inventive concept further provide a timing controller that transmits image data to a plurality of source drivers. The timing controller includes a transmission terminal connected to the plurality of source drivers via respective point-to-point links; a compression decider that determines whether to perform compression according to a monitoring result of a transmission status of the image data transmitted to the source drivers and outputs a compression enable signal responsive to the determination; and an encoder that performs compression of the image data in responsive to the compression enable signal.

Embodiments of the inventive concept still further provide a display driving circuit that includes a timing controller including an encoder configured to selectively compress image data responsive to a compression enable signal and to provide an output to a source driver of a display panel, and a compression decider configured to determine whether to compress the image data and to output the compression enable signal; and a margin monitor configured to generate margin information indicative of transmission status of a data transmission between the timing controller and the source driver. The compression decider is configured to compare the margin information to a threshold margin, and to output the compression enable signal responsive to the comparison.

BRIEF DESCRIPTION OF THE DRAWINGS

Embodiments of the inventive concept will be more clearly understood from the following detailed description taken in conjunction with the accompanying drawings in which:

FIG. 12A illustrates a graph showing data margins according to an embodiment of the inventive concept;

FIG. 12B illustrates a graph showing data margins according to an embodiment of the inventive concept;

DETAILED DESCRIPTION OF THE EMBODIMENTS

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
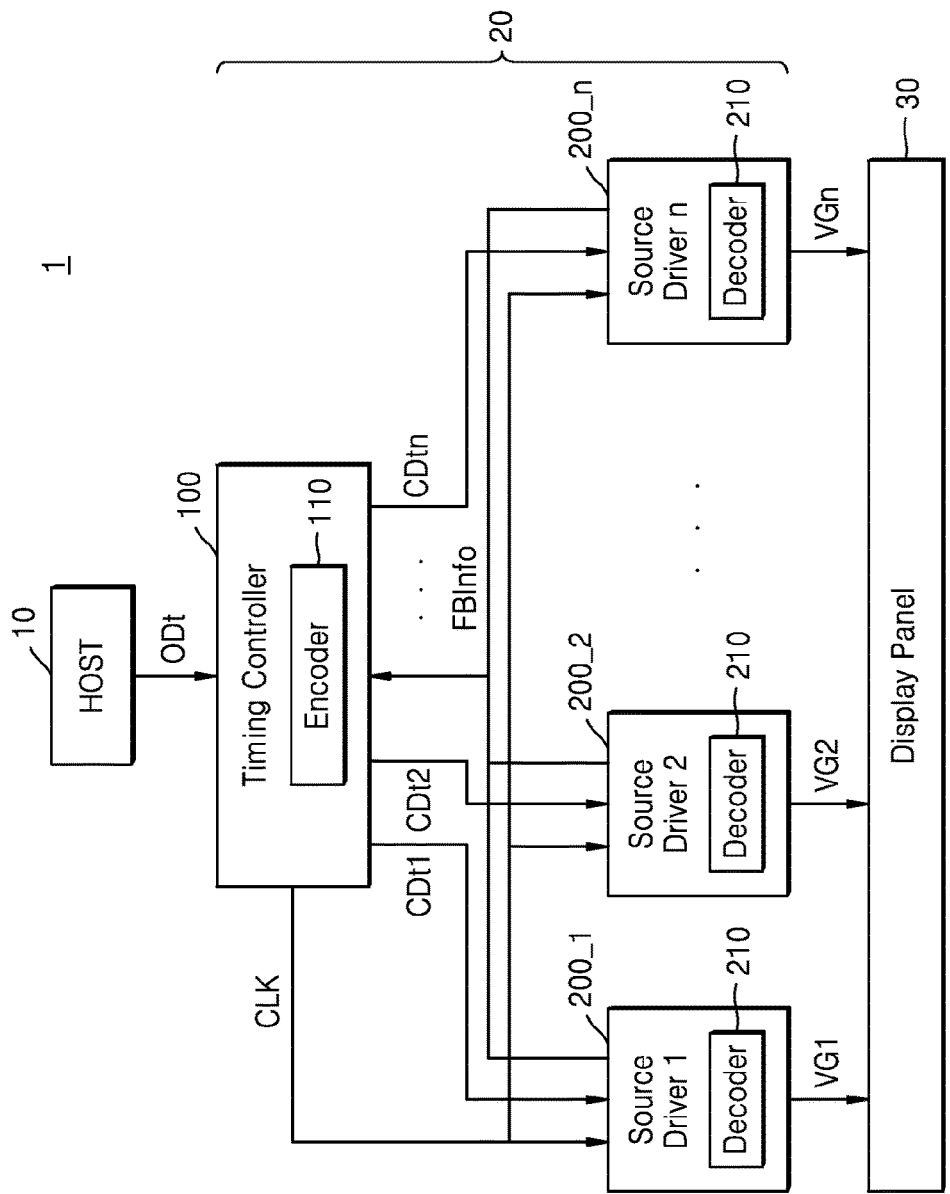
FIG. 1 illustrates a block diagram of a display system according to an embodiment of the inventive concept.

FIG. 1 illustrates a block diagram of a display system according to an embodiment of the inventive concept.

Referring to FIG. 1, display system 1 includes host 10, display driving circuit 20, and display panel 30. Also, the display driving circuit 20 includes timing controller 100 and at least one source driver, for example, source drivers 200_1, 200_2 to 200_n (i.e., source driver 1, source driver 2, to source driver n, which may hereinafter be referred to as source drivers 200_1 to 200_n).

The timing controller 100 may receive original image data ODt from the host 10. Encoder 110 included in the timing controller 100 may compress the original image data ODt to convert the original image data ODt into compressed image data CDt1, CDt2 to CDtn (which may hereinafter be referred to as compressed image data CDt1 to CDtn). The size of the compressed image data CDt1 to CDtn may be smaller than the size of the original image data ODt. The timing controller 100 may divide and transmit the compressed image data CDt1 to CDtn based on corresponding pixels corresponding to the source drivers 200_1 to 200_n.

The timing controller 100 may be connected to the source drivers 200_1 to 200_n with a point-to-point link. That is, source drivers 200_1 to 200_n are each connected to the timing controller via respective point-to-point links. The timing controller 100 may transmit pieces of the compressed image data CDt1 to CDtn to the source drivers 200_1 to 200_n that are directly connected to the timing controller 100 with the point-to-point link, respectively, according to a clock signal CLK. Decoders 210 that are included in each of the source drivers 200_1 to 200_n may decompress the transmitted compressed image data CDt1 to CDtn into original image data ODt Channels of the source drivers 200_1 to 200_n are connected to the display panel 30, and the source drivers 200_1, 200_2 to 200_n drive image pixels by respective grayscale voltages VG1, VG2 to VGn (which may hereinafter be referred to as grayscale voltages VG1 to VGn). Also, the source drivers 200_1 to 200_n may transmit feedback information FBInfo to the timing controller 100. The feedback information FBInfo may include information about a transmission status and information about an image pixel.

As a resolution and a size of a display device included in the display system 1 are increased, a distance and a required transmission speed between the timing controller 100 and the source drivers 200_1 to 200_n are also increased. According to the inventive concept, the timing controller 100 may compress data for transmitting the data to source drivers 200_1 to 200_n, so that a size of the data is decreased and the data may be transmitted at a relatively low transmission speed for a long transmission distance. In addition, since the data is compressed and transmitted through a point-to point link, image data may be transmitted in a stable manner even for a display device having a large screen such as a widescreen TV.

Figure 2:
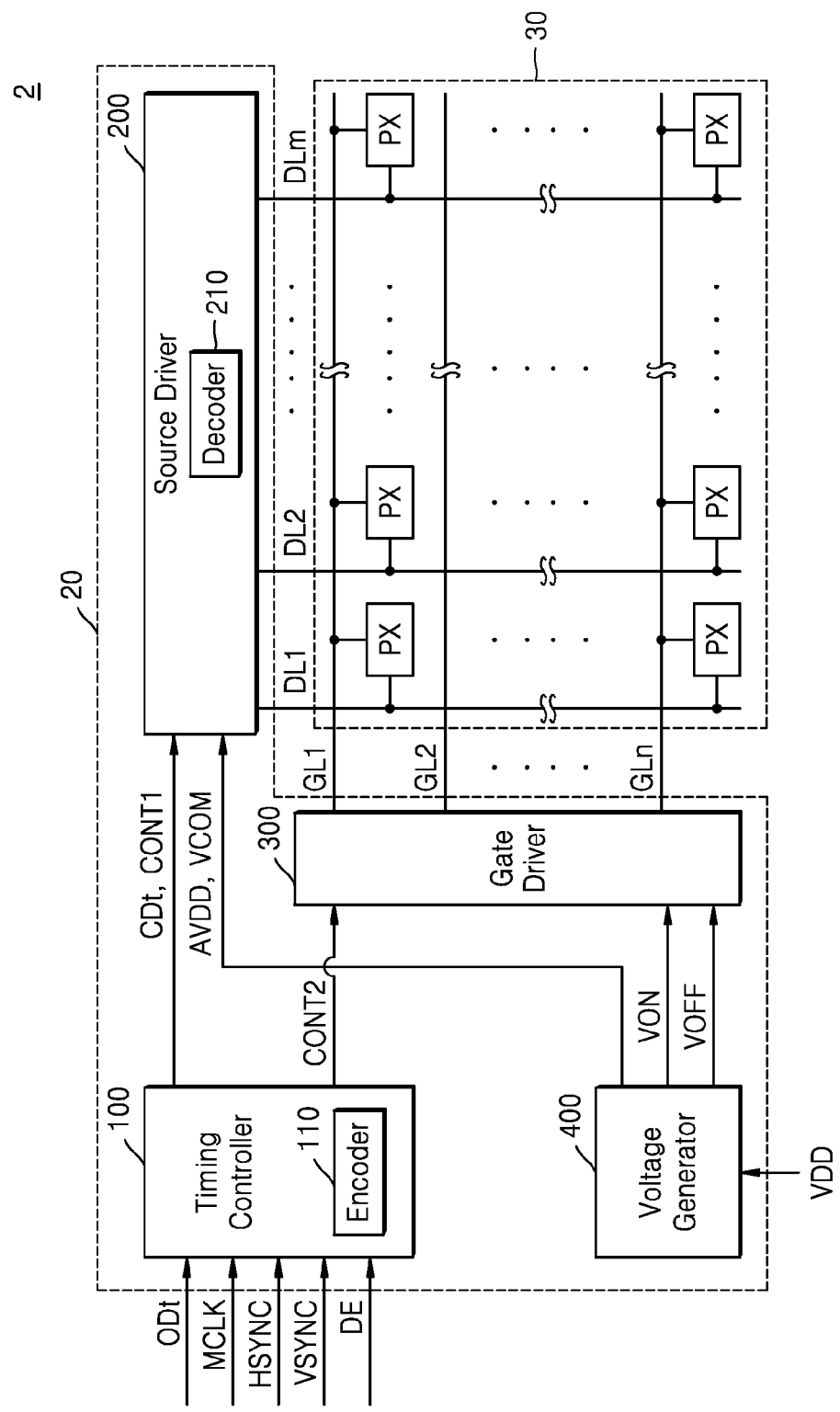
FIG. 2 illustrates a block diagram of display device according to an embodiment of the inventive concept.

FIG. 2 illustrates a block diagram of a display device according to an embodiment of the inventive concept.

Referring to FIG. 2, display device 2 includes the display driving circuit 20 and the display panel 30. The display driving circuit 20 includes the timing controller 100, a source driver 200, a gate driver 300, and a voltage generator 400.

The timing controller 100 may generate various timing control signals CONT1 and CONT2 or output data CDt, to drive the source driver 200 and the gate driver 300. The output data that the timing controller 100 transmits to the source driver 200 may be compressed image data CDt. The timing controller 100 may receive from an external device (for example, a host device (not shown)) original image data ODt, a horizontal synchronization signal H_SYNC (HSYNC), a vertical synchronization signal V_SYNC (VSYNC), a clock signal MCLK and a data enable signal DE.

The timing controller 100 may convert a format of the original image data ODt according to an interface specification of the source driver 200. Also, the encoder 110 included in the timing controller 100 may compress the original image ODt of which the format is converted to generate compressed image data CDt and then transmit the compressed image data CDt to the source driver 200. In order to control timings of the source driver 200 and the gate driver 300, the timing controller 100 may output at least one first timing control signal CONT1 to the source driver 200 and at least one second timing control signal CONT2 to the gate driver 300, based on the horizontal synchronization signal H_SYNC, the vertical synchronization signal V_SYNC, the clock signal MCLK, and the data enable signal DE.

The source driver 200 may receive the first timing signal CONT1 or the compressed image data CDt from the timing controller 100, and may drive data lines DL1, DL2 to DLm (which may hereinafter be referred to as data lines DL1 to DLm) of the display panel 30 responsive to the first timing signal CONT1 and the compressed data CDt. The decoder 210 included in the source driver 200 may decompress the compressed image data CDt into the original image data ODt. The gate driver 300 may receive the second timing signal CONT2 from the timing controller 100, and may drive gate lines GL1, GL2 to GLn (which may hereinafter be referred to as gate lines GL1 to GLn) of the display panel 30 responsive to the second timing signal CONT2.

The voltage generator 400 may generate various voltages, including a gate-on voltage VON, a gate-off voltage VOFF, an analog supply voltage AVDD, and a common voltage VCOM, that are needed to drive the display panel 30. For example, after a supply voltage VDD is applied to the voltage generator 400 from the outside, the voltage generator 400 may generate the gate-on voltage VON and the gate-off voltage VOFF and apply them to the gate driver 300, and may also generate the analog supply voltage AVDD and the common voltage VCOM and apply them to the source driver 200.

The display device 2 may be any of various flat display devices. For example, the flat display devices may include a liquid crystal display device, an organic electro luminance (EL) display device, a plasma display panel (PDP) device, and the display device 2 according to embodiments of the inventive concept may be one of these above stated devices.

Alternatively, the flat display device may be any of various flat display devices capable of sensing a physical touch or an optical touch, and the display device 2 according to embodiments of the inventive concept may also include a hybrid flat display device. For convenience sake, the flat display device in embodiments described hereinafter may be a liquid display device.

The display panel 30 may include a plurality of gate lines GL1 to GLn, a plurality of data lines DL1 to DLm that intersect the gate lines GL1 to GLn, and pixels PX that are in an area surrounded by the gate lines GL1 to GLn and the data lines DL1 to DLm. When for example the display device 2 is a thin film transistor (TFT) liquid crystal display device, each pixel may include for example a TFT having a gate electrode and a source electrode that are respectively connected to a gate line and a data line, a liquid capacitor connected to a drain electrode of the thin film transistor, and a storage capacitor (not shown).

In a pixel structure as described above, when a gate line is selected, thin film transistors of pixels connected to the selected gate line may be turned on, and then, data signals including pixel information may be applied to the respective data lines by the source driver 200. Data signals may be applied to a liquid capacitor and a storage capacitor through thin film transistors of corresponding pixels, and the liquid capacitor and the storage capacitor are driven accordingly, leading to operation of a display. As the number of pixels PX in the display panel 30 that are driven by the display driving circuit 20 is increased, the source driver 200 needs a plurality of source drivers, and each of the source drivers may drive a data line of a corresponding area of the display panel 30.

Figure 3:
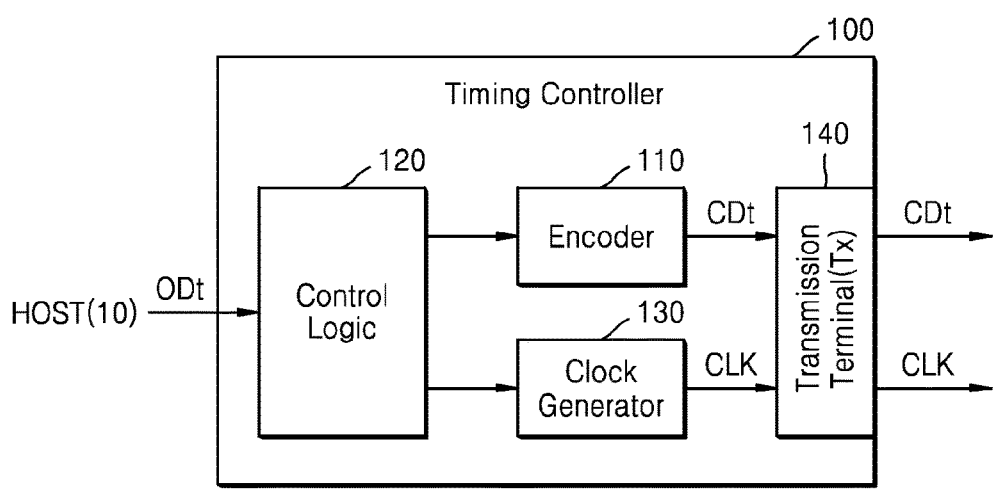
FIG. 3 illustrates a block diagram of a timing controller according to an embodiment of the inventive concept.

FIG. 3 illustrates a block diagram of a timing controller according to an embodiment of the inventive concept.

Referring to FIG. 3, the timing controller 100 includes the encoder 110, control logic 120, a clock generator 130, and a transmission terminal (Tx) 140. The timing controller 100 may receive original image data ODt from the host 10. The control logic 120 may transmit the original image data ODt to the encoder 110 and the encoder 110 may compress the received original image data ODt. The timing controller 100 may output compressed image data CDt to the outside with a clock signal CLK of the clock generator 130 through the transmission terminal 140, according to a control of the control logic 120. The clock signal may be derived from the clock signal MCLK (shown in FIG. 2).

Figure 4:
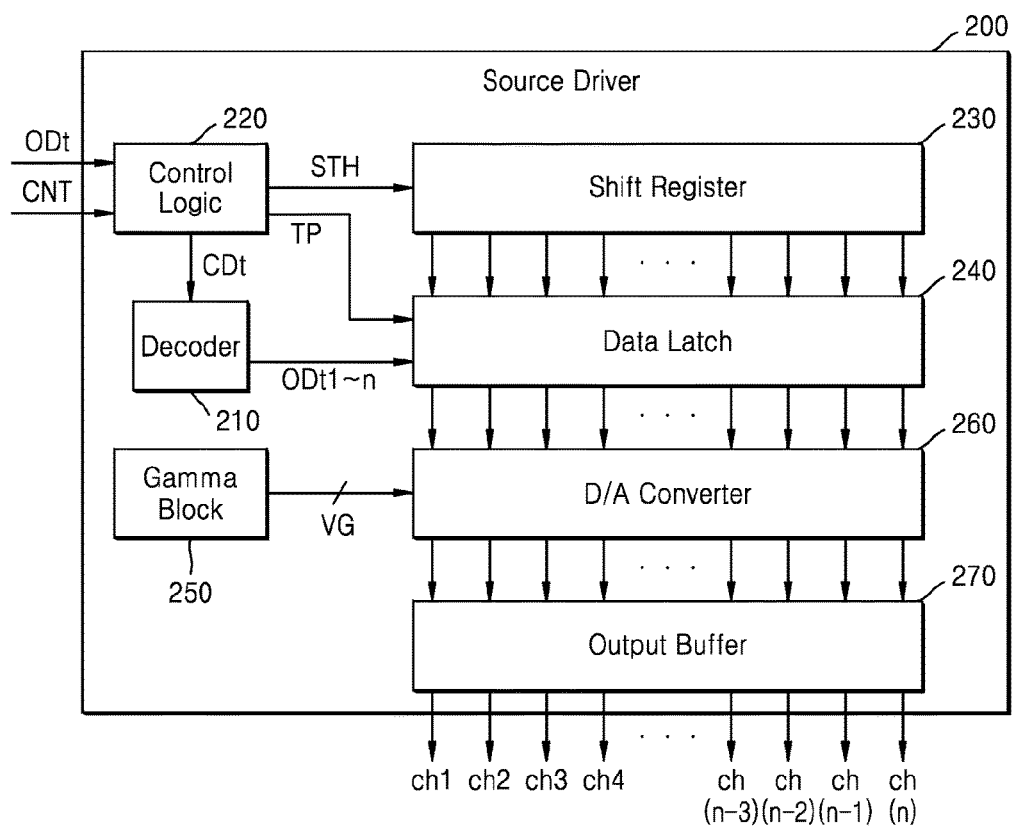
FIG. 4 illustrates a block diagram of a source driver according to an embodiment of the inventive concept.

FIG. 4 illustrates a block diagram of a source driver according to an embodiment of the inventive concept.

Referring to FIG. 4, the source driver 200 includes control logic 220, the decoder 210, a shift register 230, a data latch 240, a gamma block 250, a D/A converter 260, and an output buffer 270. The source driver 200 may receive compressed image data CDt in a digital signal format and may decompress the compressed image data CDt into original image data ODt1 to ODtn (ODt1~n) and save the original image data ODt1 to ODtn. The source driver 200 may convert the saved original image data ODt1 to ODtn to a grayscale voltage in an analog signal format and output the grayscale voltage to a display panel source line via a plurality of channels ch1 to chn (i.e., ch1, ch2, ch3, ch4, . . . ch(n−3), ch(n−2), ch(n−1), and ch(n)).

In detail, the decoder 210 may receive the compressed image data CDt from the control logic 220. The decoder 210 may decompress the compressed image data CDt that is received in a serialized format according to a predetermined decompression algorithm into the original image data ODt1 to ODtn and then parallelize the original image data ODt1 to ODtn to provide the original image data ODt1 to ODtn to the data latch 240. In another embodiment, the control logic 220 may parallelize the compressed image data CDt and provide it to the decoder 210. Then, the decoder 210 may decompress the compressed image data CDt in a parallelized format into the original image data ODt1 ODtn and provide the original image data ODt1 to ODtn to the data latch 240. The control logic 220 may receive the original image data ODt1 to ODtn and a source driver control signal CNT and generate internal control signals STH and TP based on the source driver control signal CNT. The source driver control signal CNT may include a clock signal, a polarity control signal, or information signals for driving timing. Together with the compressed image data CDt, the source driver control signal CNT may be received in a data packet format from the timing controller 100. The control logic 220 may transmit the compressed image data CDt to the decoder 210.

The shift register 230 may control timing for the original image data ODt1 to ODtn to be stored in an orderly manner in the data latch 240. The shift register 230 may perform a shifting operation based on vertical synchronization start signals (part of internal control signal STH) from the control logic 220 in an orderly manner and provide shifted clock signals to the data latch 240.

The data latch 240 may include a plurality of latch circuits and store the original image data ODt1 to ODtn corresponding to a single horizontal line in an orderly manner from one end of a latch circuit to the other end of the latch circuit, based on the clock signals output from the shift register 230. When the pieces of original image data ODt1 to ODtn are completely stored, the data latch 240 may output the original image data ODt1 to ODtn in response to a load signal (part of internal control signal TP).

The gamma block (gamma voltage generator) 250 may generate a grayscale voltage VG corresponding to a grayscale that each piece of the original image data ODt1 to ODtn represents. For example, when the pieces of the original image data ODt1 to ODtn are N-bit data signals, respectively, the gamma block 250 may generate $2^N$ grayscale voltages VG In addition, when a display panel driven by the source driver 200 is a liquid crystal display panel, the gamma block 250 may generate $2^N$ high grayscale voltages having voltage levels that are higher than a common voltage that is uniformly applied to liquid crystals of pixels and $2^N$ low grayscale voltages having voltage levels that are lower than the common voltage.

The D/A converter 260 may receive the original image data ODt1 to ODtn output from the data latch 240 and output an analog grayscale voltage corresponding to the original image data ODt1 to ODtn out of the grayscale voltages VG For example, a gamma decoder, which is one kind of the D/A converter 260, may decode the N-bit original image data ODt1 to ODtn and select one grayscale voltage out of $2^N$ grayscale voltages VG in response to a decoding result to output the selected grayscale voltage. Furthermore, the D/A converter 260 may select one grayscale voltage out of $2^N$ high grayscale voltages and $2^N$ low grayscale voltages based on a polarity control signal and output the selected grayscale voltage.

The output buffer 270 may buffer and output the analog grayscale voltage output from the D/A converter 260.

Figure 5:
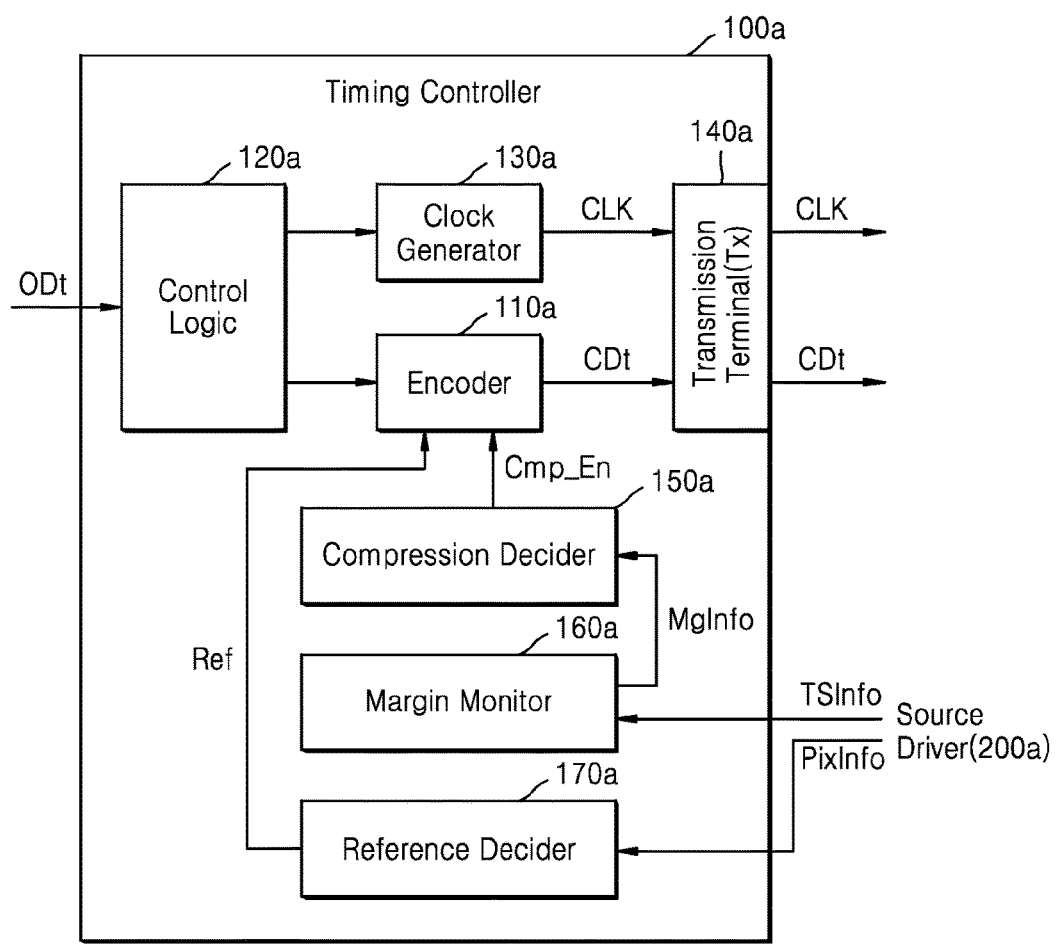
FIG. 5 illustrates a block diagram of a timing controller according to an embodiment of the inventive concept.

FIG. 5 illustrates a block diagram of a timing controller according to an embodiment of the inventive concept. The description of features provided in the timing controller illustrated in FIG. 5 that are similar to features of the timing controller illustrated in FIG. 3 may be omitted from the following.

Referring to FIGS. 3 and 5, timing controller 100a includes an encoder 110a, control logic 120a, a clock generator 130a, a transmission terminal 140a, a compression decider 150a, a margin monitor 160a, and a reference decider 170a. In particular, the encoder 110a, the control logic 120a, the clock generator 130a, and the transmission terminal 140a are respectively the same or similar as the encoder 110, the control logic 120, the clock generator 130, and the transmission terminal 140 in FIG. 3, and further detailed description of corresponding features and functionality that may be the same may be omitted from the following.

The compression decider 150a may receive margin information MgInfo from the margin monitor 160a. As will be subsequently described in detail, based on a predetermined compression threshold and the margin information MgInfo, the compression decider 150a may decide whether to compress original image data ODt that the timing controller 100a received. For this, the compression decider 150a may store a compression threshold and may update the compression threshold according to embodiments of the inventive concept. When the compression decider 150a decides to perform compression based on the compression threshold and the margin information MgInfo, the compression decider 150a may output a compression enable signal Cmp_En to the encoder 110a. According to an embodiment of the inventive concept, when the encoder 110a does not receive the compression enable signal Cmp_En, the encoder 110a may not compress the original image data ODt. When the encoder 110a receives the compression enable signal Cmp_En, the encoder 110a may compress the original image data ODt.

According to another embodiment of the inventive concept, when the encoder 110a receives a compression enable signal Cmp_En from the compression decider 150a, the encoder 110a may compress the original image data ODt and output the compressed image data CDt to the transmission terminal 140a, and may thereafter output the original image data ODt to the transmission terminal 140a without compression when a predetermined compression disable time has passed from receipt of the compression enable signal Cmp_En. However, after the predetermined compression disable time has passed, when the compression decider 150a determines that the compression is needed based on the margin information MgInfo received from the margin monitor 160a and the compression threshold, the compression decider 150a may retransmit the compression enable signal Cmp_En and in response to the compression enable signal Cmp_En the encoder 110a may perform compression again.

According to another embodiment of the inventive concept, when the compression decider 150a determines that the compression is no longer needed based on the margin information MgInfo received from the margin monitor 160a and the compression threshold, the compression decider 150a may transmit a compression disable signal to the encoder 110a. Accordingly, the encoder 110a may perform the compression of the original image data ODt responsive to a compression enable signal Cmp_En, and the encoder 110a may output the original image data ODt that is not compressed to the transmission terminal 140a in response to the compression disable signal received from the compression decider 150a. After that, when the compression decider 150a determines that the compression is needed again based on the margin information MgInfo received from the margin monitor 160a and the compression threshold, the compression decider 150a may retransmit the compression enable signal Cmp_En to the encoder 110a and, in response to the compression enable signal Cmp_En, the encoder 110a may perform compression again.

The margin monitor 160a may receive transmission status information TSInfo from a source driver 200a. The transmission status information TSInfo may be an example of the feedback information FBInfo described with respect to FIG. 1. The transmission status information TSInfo may include information about transmission characteristics of image data that the timing controller 100a transmits to the source driver 200a. In other words, the transmission status information TSInfo may include information about whether the source driver 200a correctly receives the image data from the timing controller 100a. The margin monitor 160a may generate margin information MgInfo on a data transmission margin based on the transmission status information TSInfo and transmit the margin information MgInfo to the compression decider 150a. As a non-limiting example, the margin monitor 160a may generate margin information MgInfo on a data transmission margin based on an eye diagram. In FIG. 5, the margin monitor 160a is described as a separate block, but the margin monitor 160a may be part of the compression decider 150a, or the compression decider 150a may play a role of the margin monitor 160a. In addition, although the margin monitor 160a is described to be included in the timing controller 100a, the margin monitor 160a may be included in the source driver 200a. Also, the margin monitor 160a is described as receiving the transmission status information TSInfo from the source driver 200a, but the inventive concept is not limited thereto. As long as information includes a transmission status between the timing controller 100a and the source driver 200a, the margin monitor 160a may receive transmission status information TSInfo from anywhere.

The reference decider 170a may receive pixel information PixInfo from a source driver 200a. The pixel information PixInfo may be an example of the feedback information FBInfo described with respect to FIG. 1. The reference decider 170a may determine a reference Ref based on the pixel information PixInfo. Also, the reference decider 170a may transmit the determined reference Ref to the encoder 110a, and the encoder 110a may perform compression based on the reference Ref as a unit. That is, the reference Ref may define a compression unit of the compression operation, such as in terms of sub-pixels for example. The reference Ref will be described below.

Pixel information PixInfo may be information about a pixel array included in a display panel. The pixel information PixInfo may be indicative of a connection structure about the pixel array in the display panel. The reference decider 170a in FIG. 5 is described as receiving the pixel information PixInfo from the source driver 200a, but in other embodiments the reference decider 170a may receive the pixel information PixInfo directly from a display panel. In still further embodiments, pixel information PixInfo may be already stored in the reference decider 170a. The reference decider 170a may determine a reference Ref, which is to be a compression unit, based on a predetermined matching table and the pixel information PixInfo.

Figure 6:
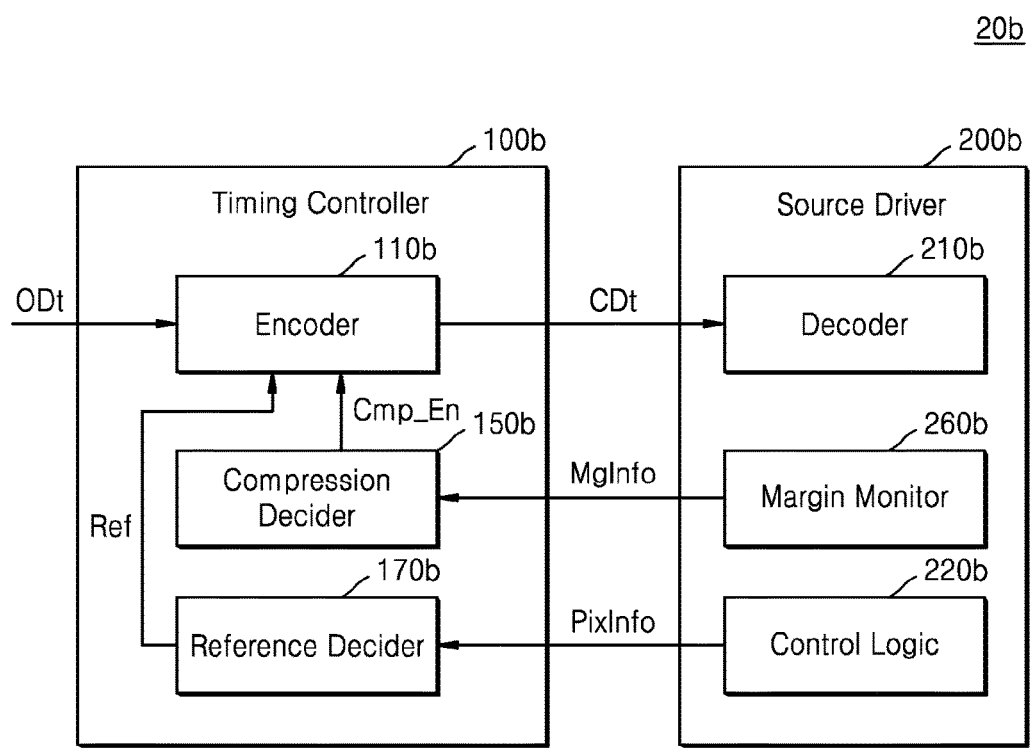
FIG. 6 illustrates a block diagram of a display driving circuit according to an embodiment of the inventive concept.

FIG. 6 illustrates a block diagram of a display driving circuit according to an embodiment of the inventive concept. The description of features provided in the display driving circuit illustrated in FIG. 6 that are similar to features of the timing controllers illustrated in FIGS. 3 and 5 and the source driver illustrated in FIG. 4 may be omitted from the following.

Referring to FIG. 6, a display driving circuit 20b includes a timing controller 100b and a source driver 200b. The timing controller 100b includes an encoder 110b, a compression decider 150b, and a reference decider 170b. The source driver 200b includes a decoder 210b, control logic 220b, and a margin monitor 260b. In particular, the encoder 110b, the compression decider 150b, the reference decider 170b, the decoder 210b, the margin monitor 260b and the control logic 220b may be respectively the same or similar as the encoder 110a, the compression decider 150a, the reference decider 170a, the decoder 210, the margin monitor 160a and the control logic 220 in FIGS. 3-5, and further detailed description of the corresponding features and functionality that may be the same may be omitted from the following. Incidentally, although not shown, timing controller 110b and source driver 200b in FIG. 6 may respectively include some of the additional features shown in FIGS. 4 and 5.

The encoder 110b may receive original image data ODt. The encoder 110b may not perform compression and may transmit the original image data ODt to the source driver 200b in response to a compression enable signal Cmp_En provided by the compression decider 120b. In this embodiment of the inventive concept, the margin monitor 260b is included in the source driver 200b. The margin monitor 260b may monitor a data transmission status between the timing controller 100b and the source driver 200b and transmit margin information MgInfo to the compression decider 150b included in the timing controller 100b. The compression decider 150b may determine whether to perform compression based on the margin information MgInfo and a compression threshold. As a non-limiting example, large margin information MgInfo may indicate that the data transmission status between the timing controller 100b and the source driver 200b is favorable, and thus, the compression decider 150b may determine not to perform compression. Otherwise, small margin information MgInfo may indicate that the data transmission status between the timing controller 100b and the source driver 200b is not favorable, and thus, the compression decider 150b may determine to perform compression. When compression is performed, a transmission speed between the timing controller 100b and the source driver 200b may be reduced, so that the data transmission status may become favorable. When compression is needed, the compression decider 150b may output the compression enable signal Cmp_En to the encoder 110b. The encoder 110b may compress the original image data ODt in response to the compression enable signal Cmp_En and transmit compressed image data CDt to the source driver 200b.

The decoder 210b included in the source driver 200b may identify that received data is not the original image data ODt but is instead the compressed image data CDt by independently receiving the compression enable signal Cmp_En from the compression decider 120b (not shown) or by identifying a format of the compressed image data CDt. Thus, the decoder 210b may decompress the compressed image data CDt into the original image data ODt by using a predetermined algorithm.

Figure 7:
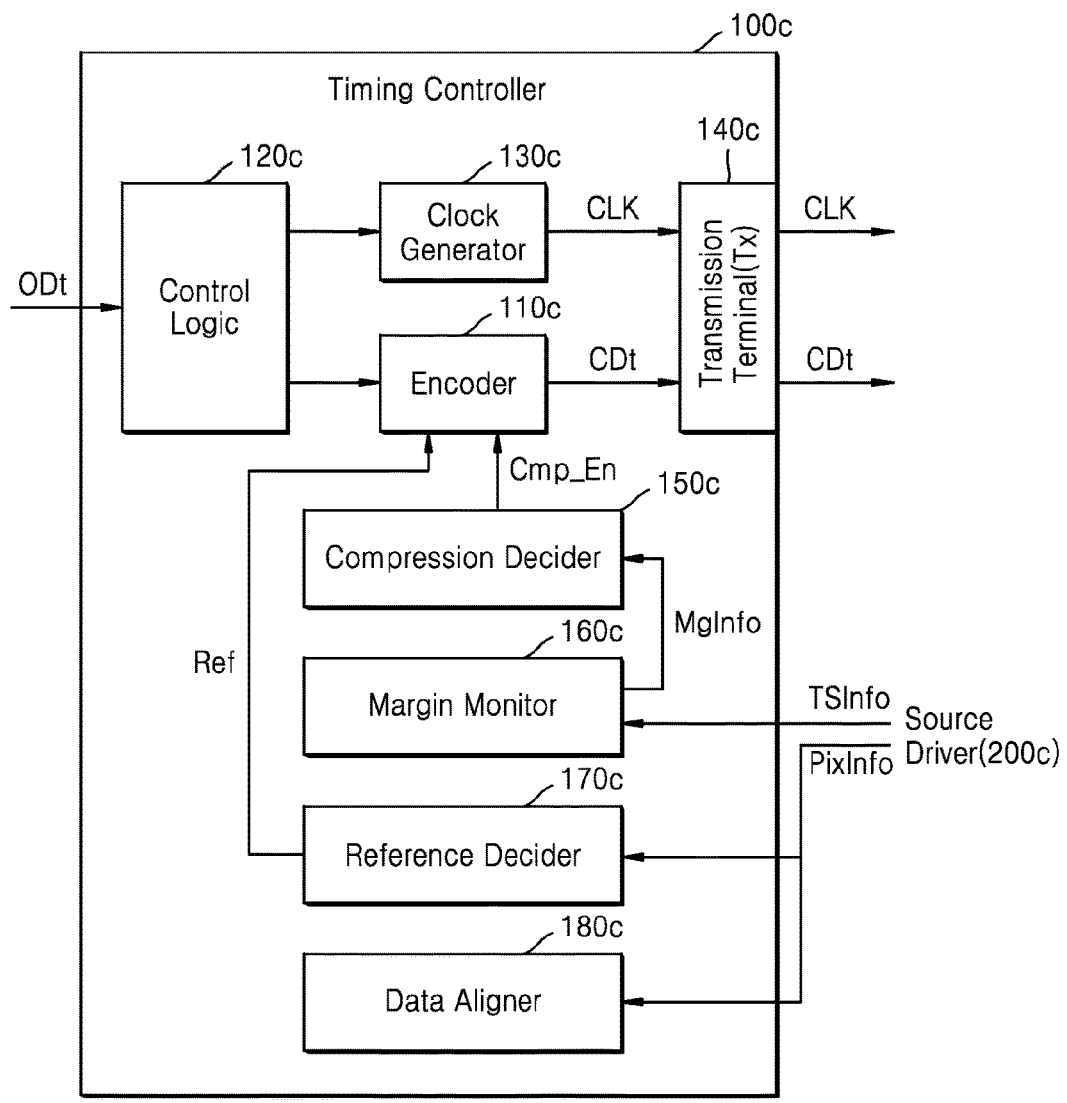
FIG. 7 illustrates a block diagram of a timing controller according to an embodiment of the inventive concept.

FIG. 7 illustrates a block diagram of a timing controller according to an embodiment of the inventive concept. The descriptions in association with FIG. 3 and FIG. 5 will be omitted. The description of features provided in the timing controller illustrated in FIG. 7 that are similar to features of the timing controllers illustrated in FIGS. 3 and 5 may be omitted from the following.

Referring to FIG. 7, a timing controller 100c includes an encoder 110c, control logic 120c, a clock generator 130c, a transmission terminal 140c, a compression decider 150c, a margin monitor 160c, a reference decider 170c, and a data aligner 180c. In particular, the encoder 110c, the control logic 120c, the clock generator 130c, the transmission terminal 140c, the compression decider 150c, the margin monitor 160c, and the reference decider 170c may be respectively the same or similar as the encoder 110a, the control logic 120a, the clock generator 130a, the transmission terminal 140a, the compression decider 150a, the margin monitor 160a, and the reference decider 170a in FIG. 5, and further detailed description of the corresponding features and functionality that may be the same may be omitted from the following.

The data aligner 180c may receive from a source driver 200c pixel information PixInfo including information about a pixel array included in a display panel. In another embodiment, the data aligner 180c may already store the pixel information PixInfo. The data aligner 180c may rearrange the original image data ODt or the compressed image data CDt according to the pixel array included in the display panel, based on the pixel information PixInfo. Although in FIG. 7 the data aligner 180c is described as included in the timing controller 100c, the inventive concept is not limited thereto. in other embodiments, the data aligner 180c may be included in the source driver 200c.

Figure 8:
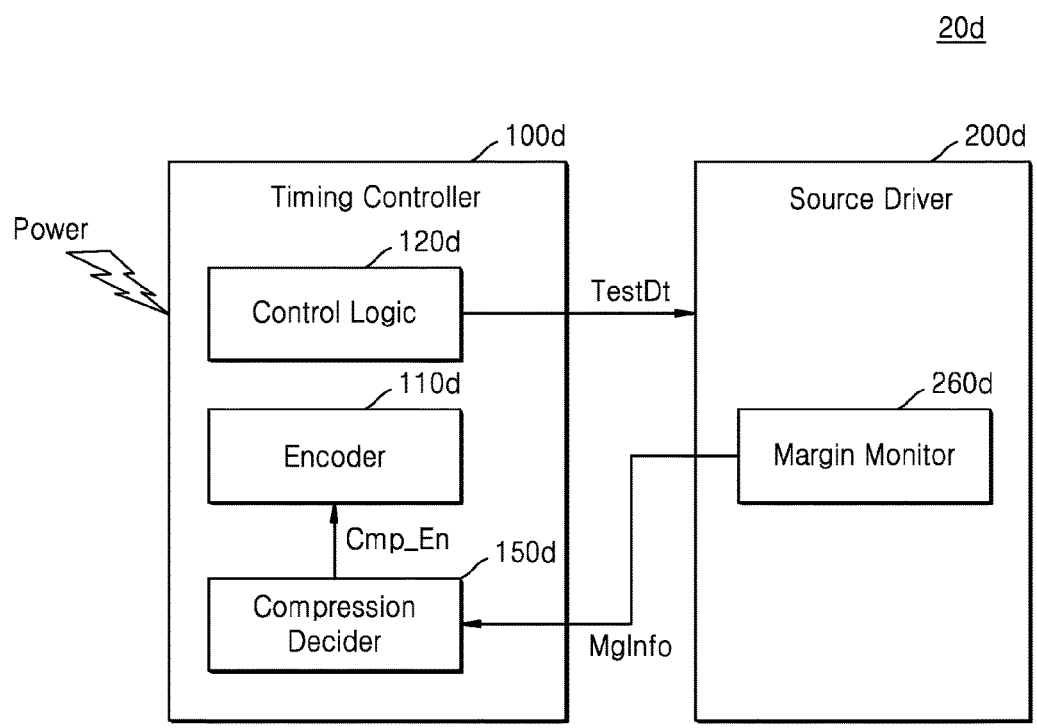
FIG. 8 illustrates a block diagram of a display driving circuit according to an embodiment of the inventive concept.

FIG. 8 illustrates a block diagram of a display driving circuit according to an embodiment of the inventive concept. The description of features provided in the display driving circuit illustrated in FIG. 8 that are similar to features of the display driving circuit illustrated in FIGS. 6 and 7 may be omitted from the following.

Referring to FIG. 8, a display driving circuit 20d includes a timing controller 100d and a source driver 200d. Also, the timing controller 100d includes an encoder 110d, control logic 120d, and a compression decider 150d. The source driver 200d includes a margin monitor 260d. In particular, the encoder 110d, the control logic 120d, the compression decider 150d and the margin monitor 260d may be respectively the same or similar as the encoder 110b, the control logic 120c, the compression decider 170b, and the margin monitor 260b in FIGS. 6 and 7, and further detailed description of the corresponding features and functionality that may be the same may be omitted from the following. Incidentally, although not shown, timing controller 110b and source driver 200b in FIG. 6 may respectively include some of the additional features shown in FIGS. 4 and 7.

When power is applied to the timing controller 100d, the control logic 120d may transmit test data TestDt to the source driver 200d. The test data TestDt may be random data. When the source driver 200d receives the test data TestDt, the margin monitor 260d may measure a margin of the received test data TestDt and transmit margin information MgInfo to the timing controller 100d.

The compression decider 150d may determine whether compression is needed based on the margin information MgInfo and the compression threshold. When compression is needed, the compression decider 150d outputs a compression enable signal Cmp_En to the encoder 110d, and the encoder 110d may compress received original image data in response to the compression enable signal Cmp_En. When compression is not needed, the encoder 110d may transmit the received original image data to the source driver 200d without performing the compression.

Figure 9:
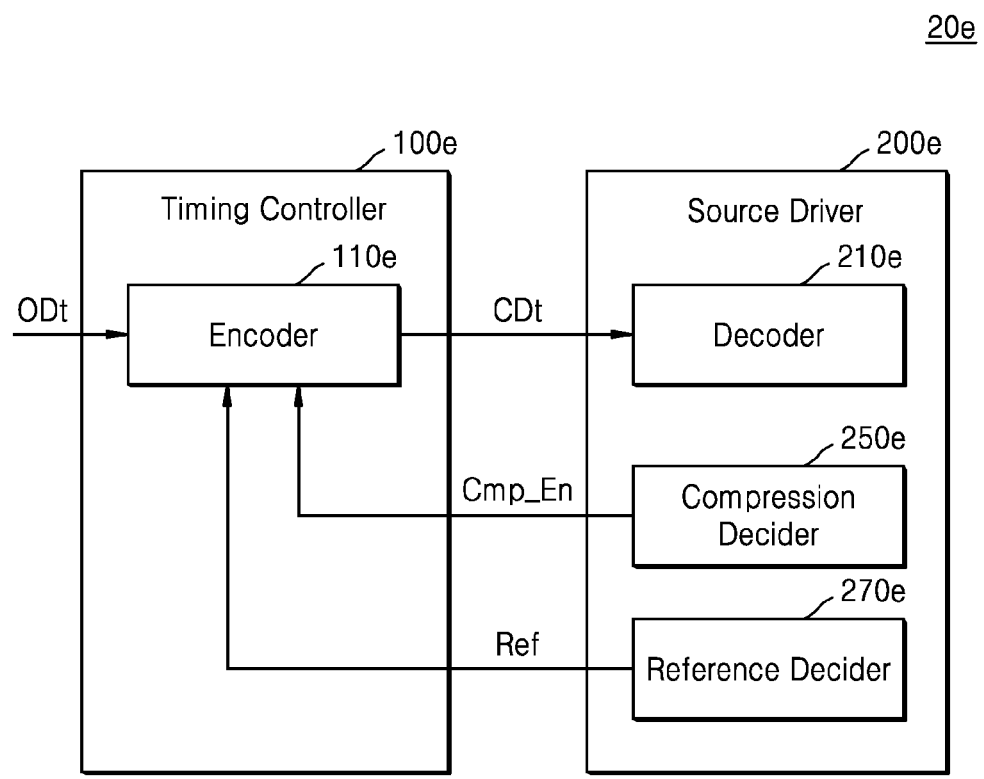
FIG. 9 illustrates a block diagram of a display driving circuit according to an embodiment of the inventive concept.

FIG. 9 illustrates a block diagram of a display driving circuit according to an embodiment of the inventive concept.

The description of features provided in the display driving circuit illustrated in FIG. 9 that are similar to features of the display driving circuit illustrated in FIG. 6 may be omitted from the following.

Referring to FIGS. 6 and 9, a display driving circuit 20e includes a timing controller 100e and a source driver 200e. The timing controller 100e includes an encoder 110e. The source driver 200e includes a decoder 210e, a compression decider 250e, and a reference decider 270e. In particular, the encoder 110e, the decoder 210e, the compression decider 250e and the reference decider 270e may be respectively the same or similar as the encoder 110b, the decoder 210b, the compression decider 150b and the reference decider 170b in FIG. 6, and further detailed description of the corresponding features and functionality that may be the same may be omitted from the following. Incidentally, although not shown, timing controller 110e and source driver 200e in FIG. 9 may respectively include some of the additional features shown in FIGS. 4 and 7.

The compression decider 250e and the reference decider 270e may function as described with reference to FIG. 6. However, differently from the descriptions with reference to FIG. 6, the compression decider 250e and the reference decider 270e may be included in the source driver 200e. The compression decider 250e may determine whether to perform compression based on a data transmission status between the timing controller 100e and the source driver 200e without receiving an additional signal and transmit a compression enable signal Cmp_En to the encoder 110e. Also, the reference decider 270e may directly receive pixel information about a pixel array from a display panel and transmit a reference Ref to the encoder 110e.

Figure 10:
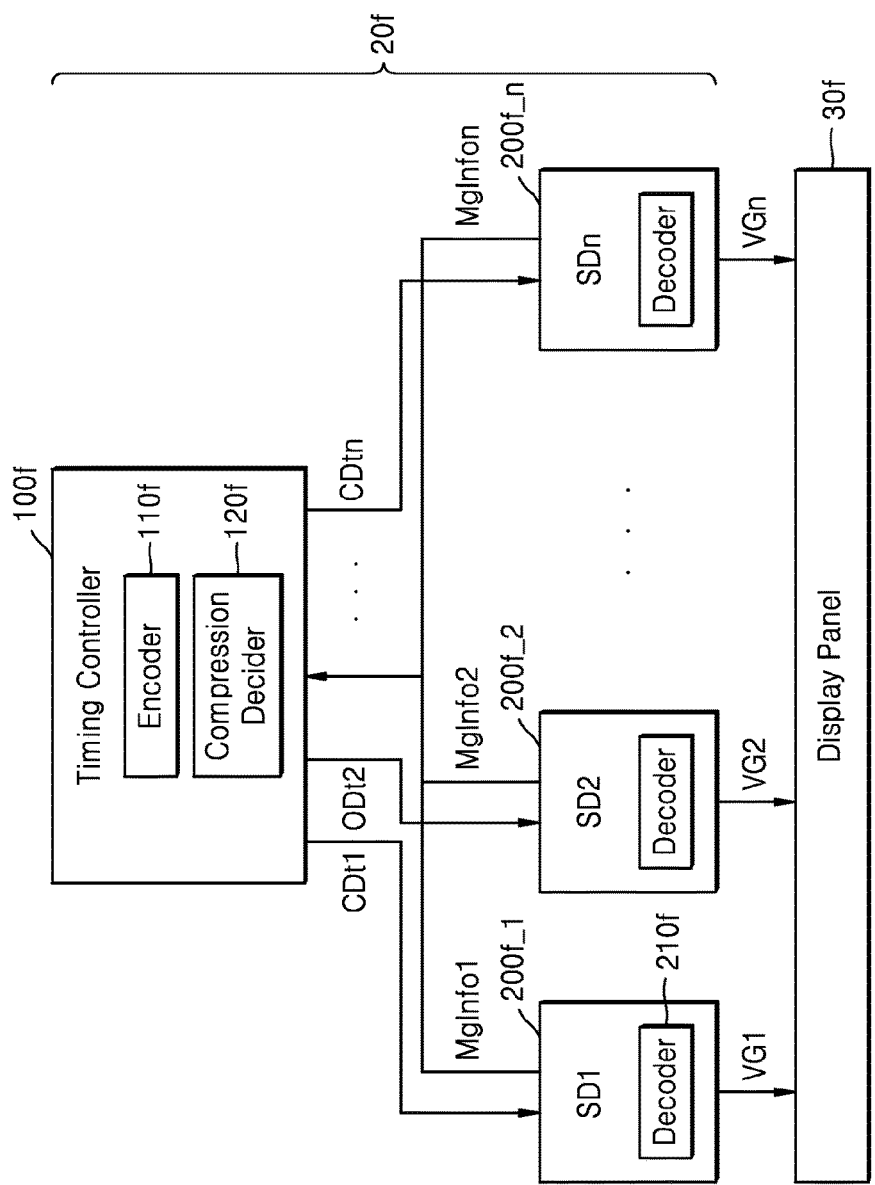
FIG. 10 illustrates a block diagram of a display system according to an embodiment of the inventive concept.

FIG. 10 illustrates a block diagram of a display system according to an embodiment of the inventive concept. The description of features provided in the display system illustrated in FIG. 1 that are similar to features of the display system illustrated in FIG. 10 may be omitted from the following.

Referring to FIG. 10, a display driving circuit 20f includes a timing controller 100f and at least one source driver, for example, source drivers 200f_1, 200f_2 to 200f_n (i.e., source driver SD1, source driver SD2, to source driver SDn, which may hereinafter be referred to as source drivers 200f_1 to 200f_n). The timing controller 100f includes an encoder 110f and a compression decider 120f.

The source drivers 200f_1 to 200f_n may each transmit margin information MgInfo1, MgInfo2 to MgInfon (which may hereinafter be referred to as margin information MgInfo1 to MgInfon) to the timing controller 100f. The compression decider 120f may respectively decide whether to perform compression based on the received margin information MgInfo1 to MgInfon. In response, the encoder 110f may compress pieces of original image data corresponding to at least some source drivers that need compression out of the source drivers 200f_1 to 200f_n. The encoder 110f may transmit compressed image data or the original image data to at least one corresponding source driver out of the source drivers 200f_1 to 200f_n. When a decoder 210f included in each of the source drivers 200f_1 to 200f_n receives the compressed image data, the decoder 210f may decompress the compressed image data and transmit the decompressed original image data to a display panel 30f. When the decoder 210f receives the original image data, the decoder 210f may transmit the received original image data to the display panel 30f.

For example, when pieces of image data corresponding to a first source driver SD1 (200f_1) and a nth source driver SDn (200f_n) need compression and image data corresponding to a second source driver SD2 (200f_2) does not need the compression, the compression decider 120f may output a compression enable signal (not shown) based on first margin information MgInfo1 and nth margin information MgInfon and may not output the compression enable signal based on second margin information MgInfo2.

In response, the encoder 110f may compress pieces of original image data corresponding to the first source driver SD1 and the nth source driver SDn and respectively transmit compressed image data CDt1 and compressed image data CDtn to the first source driver SD1 and the nth source driver SDn. Also, the encoder 110f may not compress original image data ODt2 corresponding to the second source driver SD2 and transmit the original image data ODt2 to the second source driver SD2.

The decoders 210f respectively included in the first source driver SD1 and the nth source driver SDn may decompress the compressed image data CDt1 and CDtn into the original image data and apply grayscale voltages VG1 and VGn corresponding to the original image data to the display panel 30f, while the decoder 210f included in the second source driver SD2 may not perform decompression and may directly output a grayscale voltage VG2 corresponding to the original image data ODt2 to the display panel 30f.

Figure 11:
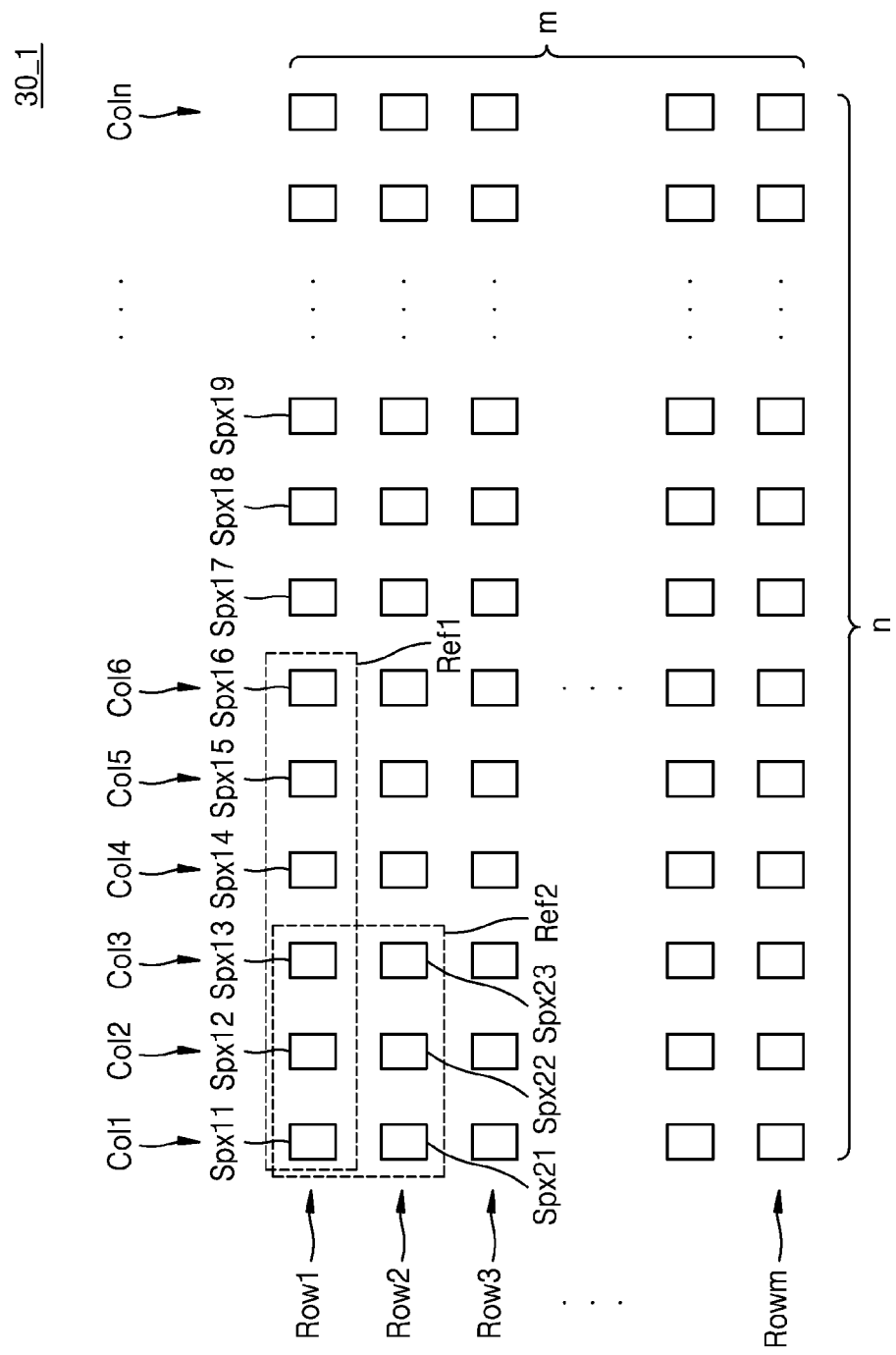
FIG. 11 illustrates a diagram including some parts of a display panel according to an embodiment of the inventive concept.

FIG. 11 illustrates a diagram that includes some parts of a display panel according to an embodiment of the inventive concept.

Referring to FIG. 11, a display panel may include a plurality of sub-pixels (image pixels) Spx. Each of the sub-pixels Spx may represent red color R, green color G, or blue color B. A sub-pixel Spx may be connected to a source driver via a channel and the source driver may control a grayscale voltage applied to the sub-pixel Spx according to received original image data. FIG. 11 shows sub-pixels Spx connected to one source driver. The display panel may include a plurality of display panel areas 30_1 and each of the display panel areas 30_1 may be connected to a source driver.

A display panel area 30_1 may include a plurality of sub-pixels Spx having m rows Row1, Row2, Row3, . . . Rown (which may hereinafter be referred to as rows Row1 to Rowm) and n columns Col1, Col2, Col3, Col4, Col5, Col6, . . . Coln (which may hereinafter be referred to as columns Col1 to Coln). The n columns Col1 to Coln may be respectively connected to n channels of the source driver. In other words, each of the n columns Col1 to Coln may be driven by one channel connected to the source driver.

The encoder 110a described with reference to FIG. 5 may perform compression based on a reference Ref which defines a compression unit for the compression operation, whereby reference Ref includes some of the sub-pixels Spx. The reference decider 170a may determine the reference Ref based on the number of sub-pixels Spx included in the display panel area 30_1. Also, when compressing original image data, the encoder 110a may not be affected by image data corresponding to a sub-pixel Spx that is not included in the reference Ref.

The reference Ref may be determined based on sub-pixels Spx in a single row. For example, when determining a reference based on six sub-pixels Spx, the reference decider 170a may determine a first reference Ref1 based on sub-pixels Spx in a single row, or a second reference Ref2 based on sub-pixels Spx in a plurality of rows as the reference Ref. However, noise only affects sub-pixels on which compression is performed based on the reference Ref, and thus, the reference decider 170a may determine the first reference Ref1 as the reference Ref. For example, when the reference Ref is determined to be the first reference Ref1 and noise occurs in a sub-pixel$_{1,2}$ Spx 12, the noise may also affect surrounding sub-pixels such as a sub-pixel$_{1,1}$ Spx11 and a sub-pixel$_{1,3}$ Spx13. However, when the reference Ref is determined to be the second reference Ref2 and noise occurs in the sub-pixel$_{1,2}$ Spx12, the noise may affect not only the sub-pixel$_{1,1}$ Spx11 and the sub-pixel$_{1,3}$ Spx13, but also a sub-pixel$_{2,2}$ Spx22. Accordingly, the reference decider 170a may determine the reference Ref based on sub-pixels Spx in a single row so that noise effect may be minimized.

In addition, n which denotes the number of columns Col1 to Coln may be a multiple of α, which denotes the number of sub-pixels Spx on which the reference Ref is based. When the encoder 110a compresses image data, the reference Ref determined based on sub-pixels Spx in a single row as described above may be one unit. For example, the first reference Ref1 includes 6 sub-pixels Spx, the encoder 110a may perform compression on the sub-pixel$_{1,1}$ Spx11 to a sub-pixel$_{1,6}$ Spx16 and then perform compression on the next six sub-pixels included in a first row Row1. The encoder 110a may consecutively perform compression on all sub-pixels in the first row Row1. However, when n which denotes the number of columns Col1 to Coln is not a multiple of α which denotes the number of sub-pixels Spx included in the reference Ref, some pieces of image data corresponding to the reference Ref applied to the last sub-pixels in a row may be left uncompressed. In order to prevent image data from being left uncompressed, the reference decider 170a may determine n which denotes the number of columns Col1 to Coln to be a multiple of α which denotes the number of sub-pixels Spx included in the reference Ref.

Also, the data aligner 180c described with reference to FIG. 7 may use array information (e.g., pixel information PixInfo) of sub-pixels Spx to rearrange image data corresponding thereto. For example, when the sub-pixel$_{1,1}$ Spx11 to the sub-pixel$_{1,6}$ Spx16 represent R, G, B, G, R, and G in an orderly manner, the data aligner 180c may rearrange corresponding image data in the same orderly manner.

FIGS. 12A and 12B illustrate graphs showing data margins according to an embodiment of the inventive concept.

Referring to FIGS. 5, 12A and 12B, the margin monitor 160a may measure eye diagrams such as shown in FIGS. 12A and 12B based on a data transmission signal between the timing controller 100a and the source driver 200a.

FIG. 12A shows a normal state in which a data transmission between the timing controller 100a and the source driver 200a works smoothly. When the margin monitor 160a transmits margin information MgInfo described with reference to FIG. 12A to the compression decider 150a, the compression decider 150a may compare the margin information MgInfo with a threshold margin MgSt that is a threshold for compression. In FIG. 12A, the margin information MgInfo does not overlap the threshold margin MgSt and thus the compression decider 150a may not output a compression enable signal Cmp_En to the encoder 110a.

FIG. 12B shows an abnormal state in which data transmission between the timing controller 100a and the source driver 200a does not work smoothly. When the margin monitor 160a transmits margin information MgInfo in FIG. 12B to the compression decider 150a, the compression decider 150a may compare the margin information MgInfo with the threshold margin MgSt that is the threshold for compression. In FIG. 12B, the margin information MgInfo overlaps the threshold margin MgSt, and thus the compression decider 150a may output the compression enable signal Cmp_En to the encoder 110a. The encoder 110a may compress received original image data ODt in response to the compression enable signal Cmp_En. When the encoder 110a performs the compression, the amount of data to be transmitted may be reduced and thus a transmission speed may be decreased. As a result, a data transmission characteristic may be improved.

Figure 13:
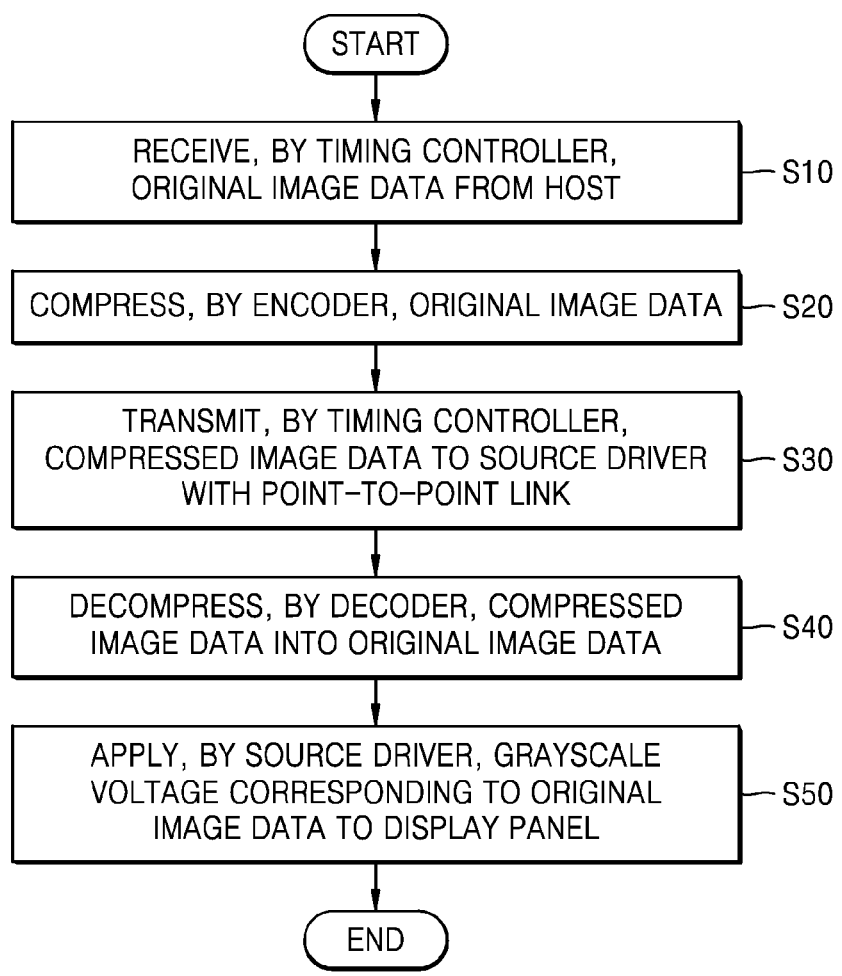
FIG. 13 illustrates a flowchart of an operation of a display driving circuit according to an embodiment of the inventive concept.

FIG. 13 illustrates a flowchart of an operation of a display driving circuit according to an embodiment of the inventive concept.

Referring to FIGS. 1 and 13, when the timing controller 100 receives original image data ODt from the host 10 (S10), the encoder 110 included in the timing controller 100 may compress the original image data ODt (S20). When the timing controller 100 transmits compressed image data CDt to source drivers 200_1 to 200_n through a point-to-point link (S30), the decoders 210 included in the source drivers 200_1 to 200_n may decompress the compressed image data CDt into original image data ODt1 to ODtn (S40). Then, the source drivers 200_1 to 200_n may apply grayscale voltages corresponding to the decompressed original image data ODt1 to ODtn to a display panel (S50).

Figure 14:
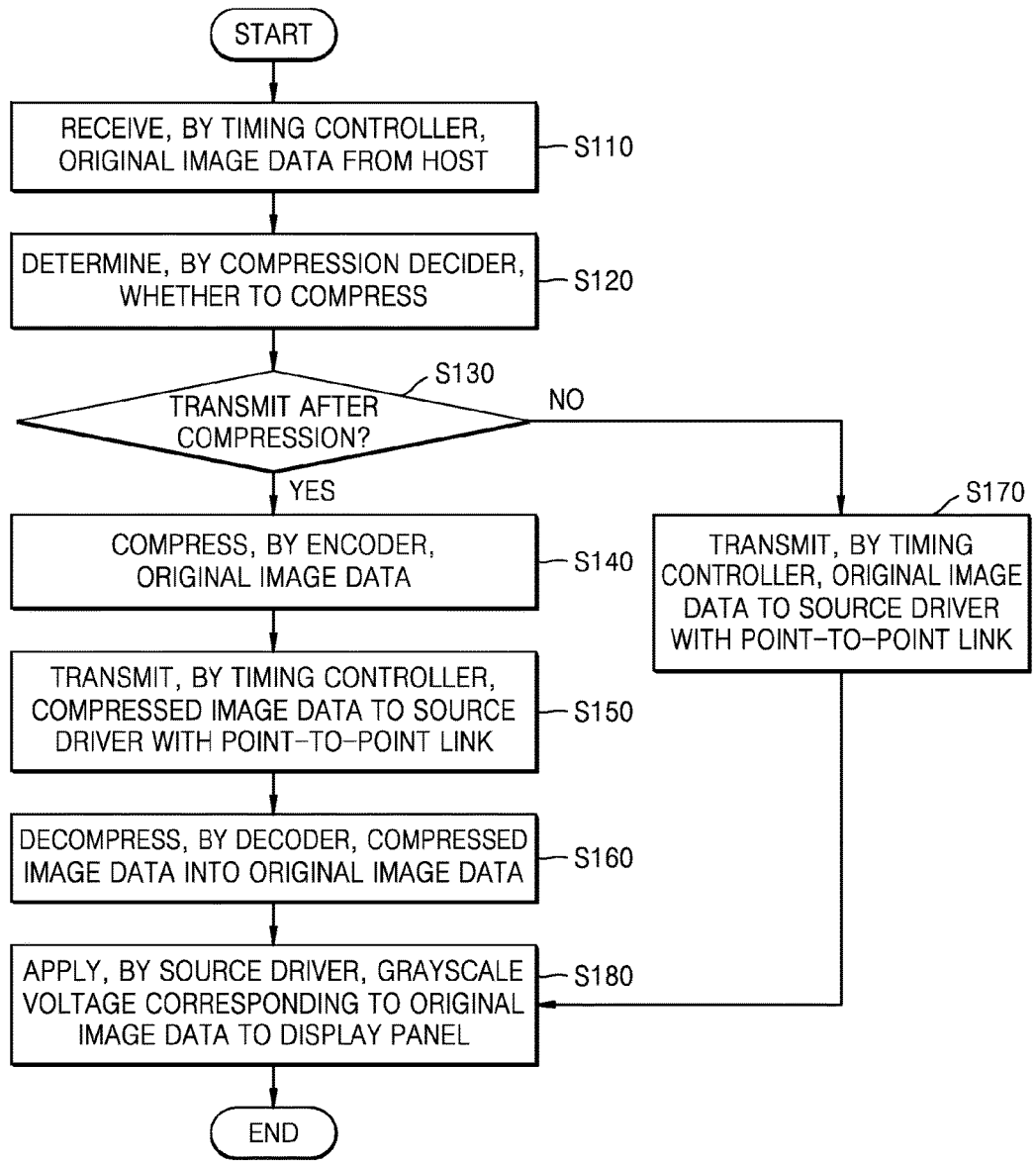
FIG. 14 illustrates a flowchart of an operation of a display driving circuit according to an embodiment of the inventive concept.

FIG. 14 illustrates a flowchart of an operation of a display driving circuit according to an exemplary embodiment of the present disclosure.

Referring to FIGS. 6 and 14, when the timing controller 100b receives original image data ODt from a host (S110), the compression decider 150b may determine whether to perform compression (S120). When compression is needed (YES in S130), the encoder 110b may compress the original image data ODt (S140). When the timing controller 100b transmits compressed image data CDt to the source driver 200b through a point-to-point link (S150), the decoder 210b may decompress the compressed image data CDt into the original image data ODt (S160). Next, the source driver 200b may transmit grayscale voltage corresponding to the decompressed original image data ODt to a display panel (S180).

When the compression decider 120b determines that the compression is not needed (NO in S130), the timing controller 100b may transmit the original image data ODt to the source driver 200b through a point-to-point link (S170). Then, the source driver 200b may apply a grayscale voltage corresponding to the original image data ODt to a display panel (S180).

Figure 15:
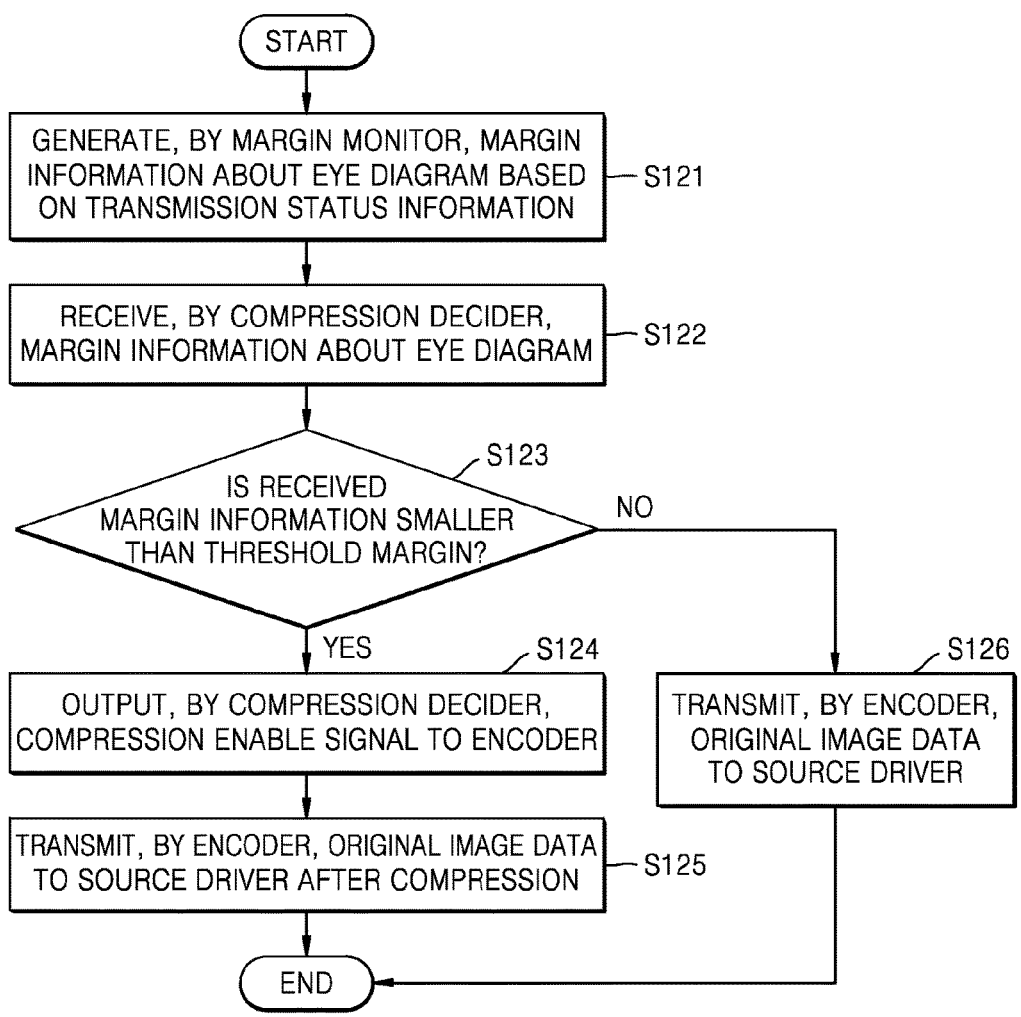
FIG. 15 illustrates a flowchart of operations of a compression decider and an encoder according to an embodiment of the inventive concept.

FIG. 15 illustrates a flowchart of operations of a compression decider and an encoder according to an embodiment of the inventive concept. FIG. 15 may be characterized as a flowchart showing operation S120 of FIG. 14 in detail.

Referring to FIGS. 5 and 15, the margin monitor 160a may generate margin information MgInfo about an eye diagram based on transmission status information TSInfo (S121). When the compression decider 150a receives the margin information MgInfo from the margin monitor 160a (S122), the compression decider 150a may determine whether the received margin information MgInfo is smaller than a threshold margin (S123). When the compression decider 150a determines that the received margin information MgInfo is smaller than the threshold margin (YES in S123), the compression decider 150a may output a compression enable signal Cmp_En to the encoder 110a (S124). The encoder 110a may compress original image data ODt in response to the compression enable signal Cmp_En of the compression decider 150a and then transmit compressed image data CDt to a source driver (S125). When the compression decider 150a determines that the received margin information MgInfo is not smaller than the threshold margin (NO in S123), the compression decider 150a may not output the compression enable signal Cmp to the encoder 110a, and the encoder 110a may transmit the original image data ODt to the source driver without performing compression (S126).

Figure 16:
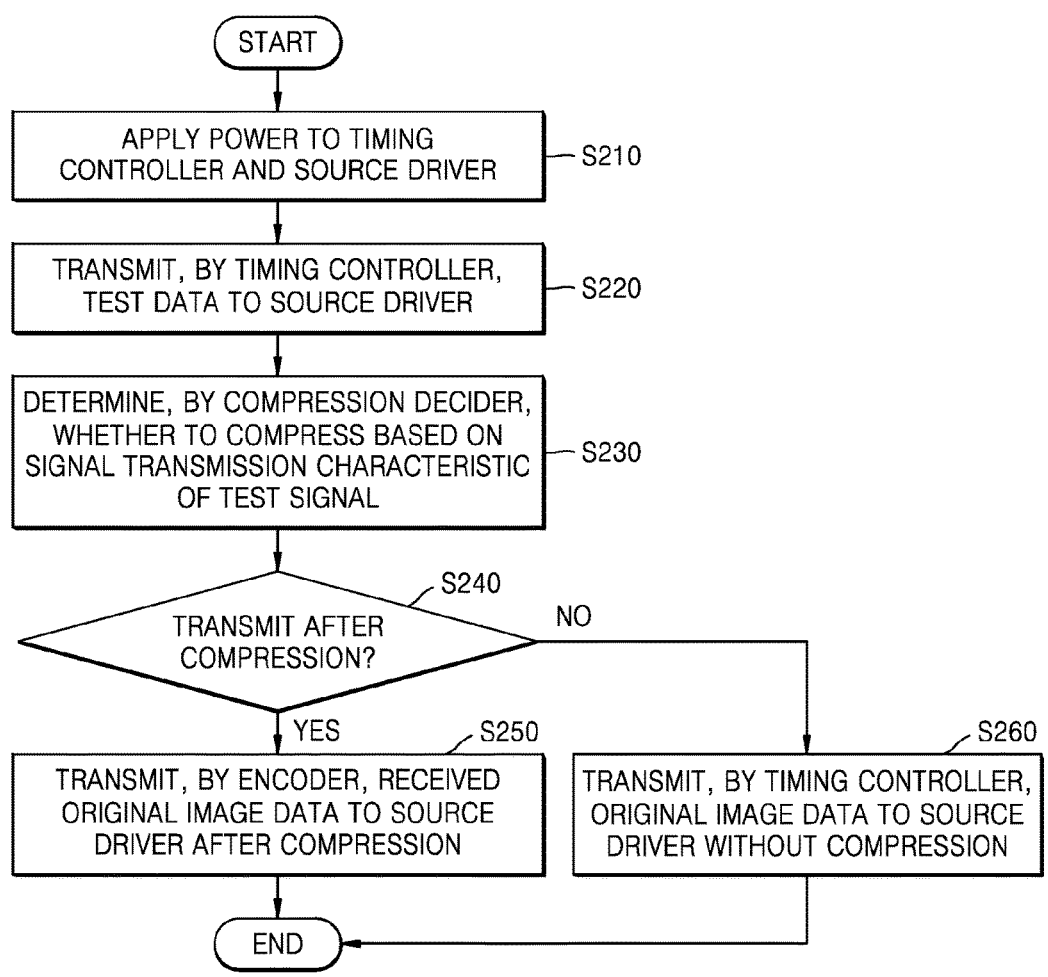
FIG. 16 illustrates a flowchart of operations of a display driving circuit according to an embodiment of the inventive concept.

FIG. 16 illustrates a flowchart of operations of a display driving circuit according to an embodiment of the inventive concept.

Referring to FIGS. 8 and 16, when power is applied to the timing controller 100d and the source driver 200d (S210), the timing controller 100d may transmit test data TestDt to the source driver 200d (S220). The compression decider 150d may determine whether to perform compression based on margin information MgInfo (i.e., signal transmission characteristic) on a test signal as received from margin monitor 260d (S230). When compression is needed (YES in S240), the encoder 110d may compress original image data ODt in response to a compression enable signal Cmp_En of the compression decider 130d and then transmit compressed image data CDt to the source driver 200d (S250). When compression is not needed (NO in S240), the timing controller 100 may transmit the original image data ODt to the source driver 200d without performing the compression (S260).

Figure 17A:
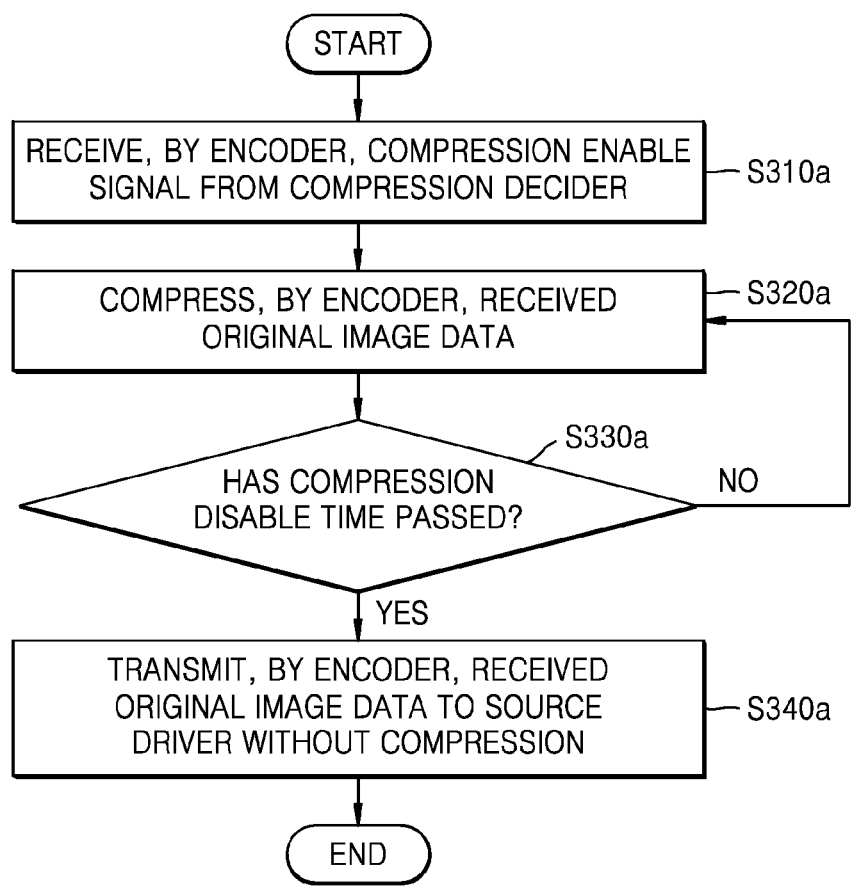
FIG. 17A illustrates a flowchart of operations of an encoder according to an embodiment of the inventive concept.

FIG. 17A illustrates a flowchart of operations of an encoder according to an embodiment of the inventive concept. FIG. 17A may be characterized as a flowchart descriptive of a compression disable feature.

Referring to FIGS. 5 and 17A, when the encoder 110a receives a compression enable signal Cmp_En from the compression decider 150a (S310a), the encoder 110a may compress received original image data ODt and transmit the compressed image data CDt to the source driver 200a (S320a). Then the timing controller 100a may determine whether a predetermined compression disable time has passed (S330a). When the predetermined compression disable time has passed (YES in S330a), the timing controller 100a may transmit the received original image data ODt to the source driver 200a without performing compression (S340a). When the predetermined compression disable time has not passed (NO in S330a), the encoder 110a may continue to compress the received original image data ODt (S320a).

Figure 17B:
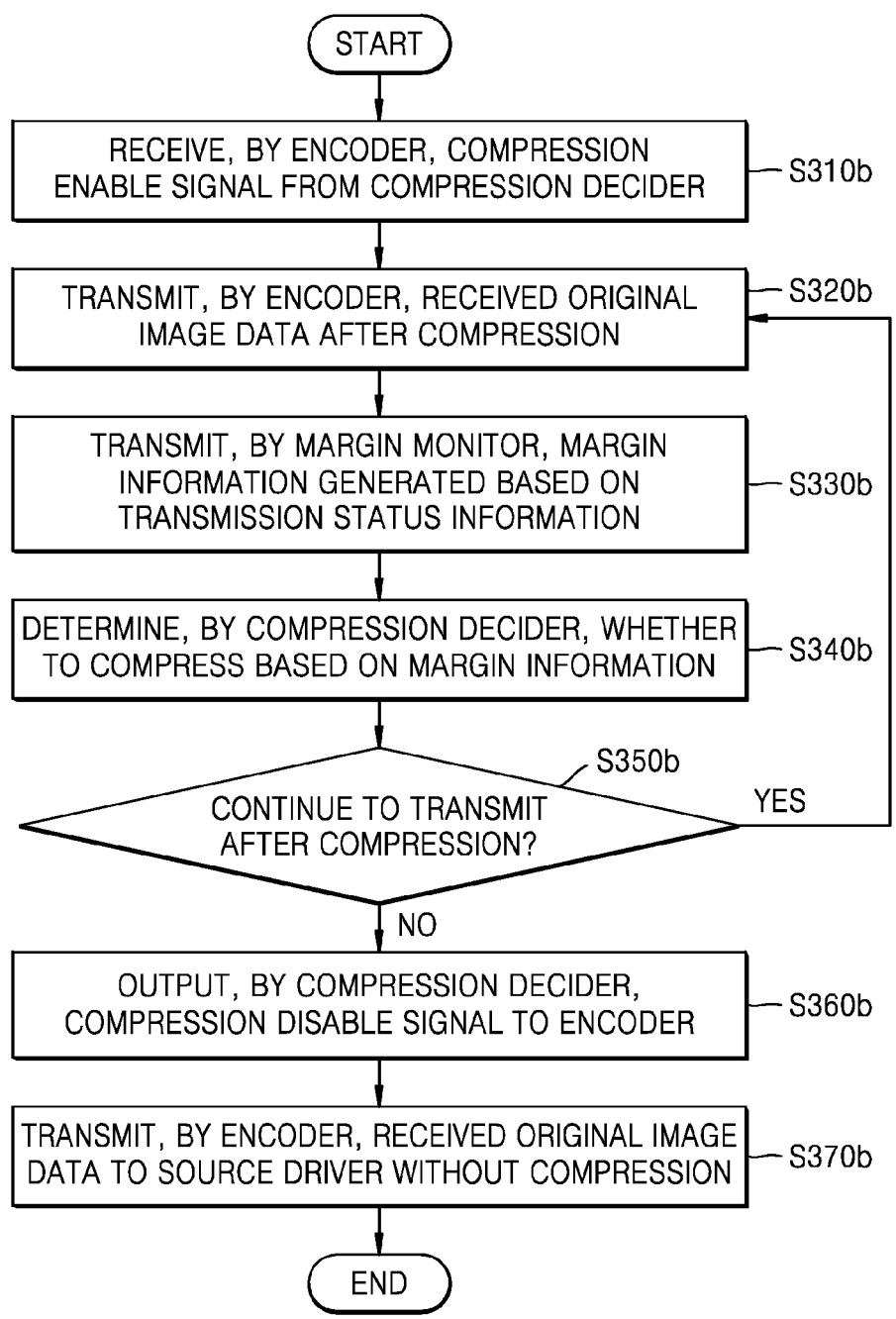
FIG. 17B illustrates a flowchart of operations of an encoder according to another embodiment of the inventive concept.

FIG. 17B illustrates a flowchart of operations of an encoder according to another embodiment of the inventive concept. FIG. 17B may be characterized as a flowchart descriptive of a compression disable feature.

Referring to FIGS. 5 and 17B, when the encoder 110a receives a compression enable signal Cmp_En from the compression decider 150a (S310b), the encoder 110a may compress received original image data ODt and transmit compressed image data CDt to the source driver 200a (S320b). When the margin monitor 160a transmits margin information MgInfo generated based on transmission status information TSInfo to the compression decider 150a (S330b), the compression decider 150a may determine whether to continue compression (S340b). When the compression decider 150a determines that the compression needs to continue (YES in S350b), the encoder 110a may continue to compress the received original image data ODt and then transmit the compressed image data CDt to the source driver 200a (S320b). When the compression decider 150a determines that the compression is no longer needed (NO in S350b), the compression decider 150a may output a compression disable signal to the encoder 110a (S360b). In response to the compression disable signal, the encoder 110a may transmit the received original image data ODt to the source driver 200a without performing the compression (S370b).

Figure 18:
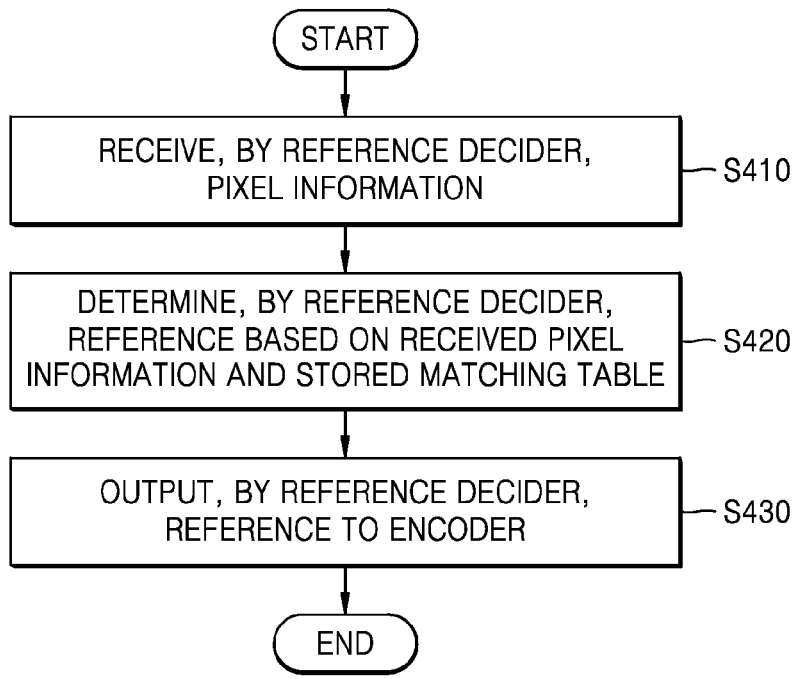
FIG. 18 illustrates a flowchart of operations of a reference decider according to an exemplary embodiment of the inventive concept.

FIG. 18 illustrates a flowchart of operations of a reference decider according to an embodiment of the inventive concept.

Referring to FIGS. 5 and 18, when the reference decider 170a receives pixel information PixInfo (S410), the reference decider 170a may determine a reference Ref based on the received pixel information PixInfo and a prestored matching table (S420). In embodiments of the inventive concept, the prestored matching table may include therein various references Ref designated for use responsive to a plurality of possible pixel information PixInfo. Then, the reference decider 170a may output the determined reference Ref to the encoder 110a (S430), and the encoder 110a may perform compression based on the determined reference Ref. As described previously with respect to FIG. 11, when compressing original image data, the encoder 110a may not be affected by image data corresponding to a sub-pixel Spx that is not included in the reference Ref. Compression by the encoder 110a based on a first reference may thus be performed independently of compression based on a second reference, whereby the effect of noise may be minimized.

Figure 19:
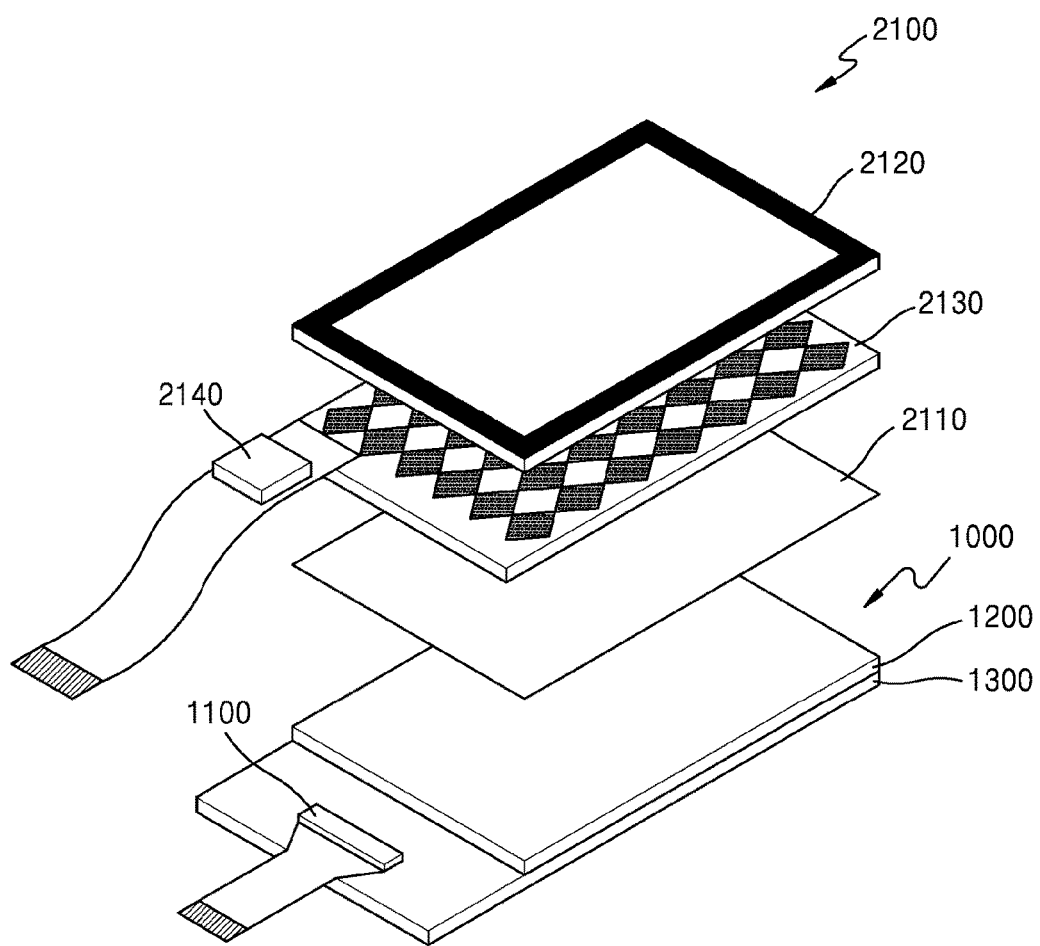
FIG. 19 illustrates a diagram of a display module according to an embodiment of the inventive concept.

FIG. 19 illustrates a diagram of a display module according to an embodiment of the inventive concept.

Referring to FIG. 19, a display module 2100 includes a display device 1000, a polarizer 2110 and a window glass 2120. The display device 1000 may include a display panel 1200, a printed board 1300, and a display driving circuit 1100.

The window glass 2120 generally includes a material such as acrylic, and tempered glass so as to prevent the display module 2100 from being scratched by external shock or repeated touches. The polarizer 2110 may improve an optical characteristic of the display panel 1200. The display panel 1200 is formed by patterning a transparent electrode on the printed board 1300. The display panel 1200 may include a plurality of pixel cells for representing a frame. According to an embodiment, the display panel 1200 may be an organic light-emitting diode panel. Each of the pixel cells may include an organic light-emitting diode that emits light in response to current flow. However, embodiments are not limited thereto, and the display panel 1200 may include various display elements. For example, the display panel 1200 may be one of a liquid crystal display (LCD), an electrochromic display (ECD), a digital mirror device (DMD), an actuated mirror device (AMD), a grating light value (GLV), a plasma display panel (PDP), an electro luminescent display (ELD), a light-emitting diode (LED) display, and a vacuum fluorescent display (VFD).

The display driving circuit 1100 may be a display device described in association with FIG. 1 and the other figures. In the present embodiment, the display driving circuit 1100 is described as a single chip for convenience sake, but the display driving circuit 1100 may also be a plurality of chips. Also, the display driving circuit 1100 may be mounted on the printed board 1300 made of glass in a chip-on-glass (COG) form. However, embodiments are not limited thereto, and the display driving circuit 1100 may be mounted in various forms such as chip-on-film (COF) and chip-on-board (COB).

The display module 2100 may further include a touch panel 2130 and a touch controller 2140. The touch panel 2130 may be formed by patterning a transparent electrode such as an indium tin oxide (ITO) on a glass substrate or a polyethylene terephthalate (PET) film. The touch controller 2140 may detect a touch on the touch panel 2130 and calculate a touch coordinate to transmit the touch coordinate to a host (not shown). The touch controller 2140 and the display driving circuit 1100 may be disposed on single semiconductor chip.

While the inventive concept has been particularly shown and described with reference to embodiments thereof, it will be understood that various changes in form and details may be made therein without departing from the spirit and scope of the following claims.

What is claimed is:

1. A display driving circuit comprising:
a timing controller comprising an encoder configured to compress image data based on a reference that is separate from the image data and that has $\alpha$ image pixels of the image data as a compression unit, and to output the compressed image data, wherein $\alpha$ is an integer greater than or equal to 1; and
at least one source driver comprising a decoder configured to decompress the compressed image data and to apply grayscale voltages that correspond to the decompressed image data to a display panel through a plurality of channels, wherein the at least one source driver provides feedback to the timing controller to use to determine the reference,
wherein compression by the encoder based on a first reference is performed independently of compression based on a second reference.

2. The display driving circuit of claim 1, wherein the at least one source driver comprises a plurality of source drivers, and
wherein the timing controller is connected to the plurality of source drivers via point-to-point links.

3. The display driving circuit of claim 2, wherein the plurality of source drivers each comprise a compression decider circuit configured to determine whether to perform compression based on a predetermined compression threshold and a signal transmission characteristic of the image data, and to output a compression enable signal to the timing controller for driving the encoder, and
wherein the encoder is configured to perform compression responsive to the compression enable signal.

4. The display driving circuit of claim 1, wherein the timing controller further comprises a reference decider circuit configured to determine the reference according to a connection structure of image pixels in the display panel, and
wherein the reference decider circuit is configured to determine the reference so that a number of the plurality of channels of the at least one source driver is a multiple of a number of the image pixels in a row of the reference.

5. The display driving circuit of claim 1, wherein the encoder is configured to compress image data corresponding to the $\alpha$ image pixels in a single row based on the reference.

6. The display driving circuit of claim 1, wherein the timing controller further comprises an aligner circuit configured to rearrange image data to be compressed according to an array of image pixels in the display panel.

7. The display driving circuit of claim 1, wherein the timing controller further comprises a compression decider circuit configured to determine whether to perform compression based on information about a signal transmission characteristic of the image data and a predetermined compression threshold, and to output a compression enable signal for driving the encoder, and
wherein the encoder is configured to perform compression responsive to the compression enable signal.

8. The display driving circuit of claim 7, wherein the timing controller is further configured to transmit a test signal to the at least one source driver when power is applied to the timing controller and the at least one source driver, and
wherein the compression decider circuit is configured to determine whether to perform compression based on a signal transmission characteristic of the test signal and the predetermined compression threshold.

9. The display driving circuit of claim 7, wherein the timing controller further comprises a margin monitor circuit configured to measure a transmission margin of the image data transmitted between the timing controller and the at least one source driver according to an eye diagram, and to transmit the measured transmission margin to the compression decider circuit, and
wherein the compression decider circuit is configured to determine whether to perform compression based on the transmission margin and the predetermined compression threshold.

10. The display driving circuit of claim 7, wherein the encoder is configured to no longer perform compression when a predetermined time has passed since the encoder receives the compression enable signal.

11. The display driving circuit of claim 7, wherein the compression decider circuit is configured to output a compression disable signal when compression is not needed, and
wherein the encoder is configured to stop performing compression in response to the compression disable signal.

12. A timing controller that transmits image data to a plurality of source drivers, the timing controller comprising
a transmission terminal connected to the plurality of source drivers via respective point-to-point links;
a compression decider circuit configured to determine as a determination whether to perform compression according to a monitoring result of a transmission status of the image data transmitted to the source drivers and to output a compression enable signal responsive to the determination, wherein the source drivers provide the monitoring result as feedback to the timing controller; and
an encoder configured to perform compression of the image data responsive to the compression enable signal.

13. The timing controller of claim 12, wherein the encoder is configured to compress the image data using $\alpha$ image pixels of the image data as a compression unit, wherein $\alpha$ is an integer greater than or equal to 1, and
wherein a number of channels between a source driver from among the plurality of source drivers and a display panel is a multiple of $\alpha$.

14. The timing controller of claim 12, wherein the compression decider circuit is configured to receive information about image transmission status from each of the plurality of source drivers, to determine whether to perform compression for each of the plurality of source drivers, and to output a compression enable signal for each of the plurality of source drivers, and
wherein the encoder is configured to compress image data to be transmitted to a source driver from among the plurality of source drivers for which a compression enable signal is output, and to not compress image data to be transmitted to a source driver from among the plurality of source drivers for which a compression enable signal is not output.

15. The timing controller of claim 14, wherein the timing controller is configured to transmit a test signal to the plurality of source drivers when power is applied to the timing controller and the plurality of source drivers, and
wherein the compression decider circuit is configured to determine whether to perform compression of the image data based on a predetermined compression threshold and a signal transmission characteristic of the test signal for each of the plurality of source drivers.

16. A display driving circuit comprising:
a timing controller comprising an encoder configured to selectively compress image data responsive to a compression enable signal and to provide an output to a source driver of a display panel, and a compression decider circuit configured to determine whether to compress the image data and to output the compression enable signal; and
a margin monitor circuit configured to generate margin information indicative of transmission status of a data transmission between the timing controller and the source driver wherein the margin monitor circuit provides the margin information as feedback to the timing controller,
wherein the compression decider circuit is configured to compare the margin information to a threshold margin as a comparison, and to output the compression enable signal responsive to the comparison.

17. The display driving circuit of claim 16, wherein the margin monitor circuit is disposed as part of the timing controller.

18. The display driving circuit of claim 16, wherein the margin monitor circuit is disposed as part of the source driver.

19. The display driving circuit of claim 16, wherein the data transmission comprises a test signal transmitted to the source driver when power is applied to the timing controller and the source driver.

20. The display driving circuit of claim 16, wherein the encoder is configured to compress the image data using $\alpha$ image pixels of the image data as a compression unit, wherein $\alpha$ is an integer greater than or equal to 1, and
wherein a number of channels between the source driver and the display panel is a multiple of $\alpha$.

* * * * *